(12) United States Patent
Reed et al.

(10) Patent No.: US 8,225,239 B2
(45) Date of Patent: Jul. 17, 2012

(54) METHODS FOR DEFINING AND UTILIZING SUB-RESOLUTION FEATURES IN LINEAR TOPOLOGY

(75) Inventors: Brian Reed, San Jose, CA (US); Michael C. Smayling, Fremont, CA (US); Joseph N. Hong, Cupertino, CA (US); Stephen Fairbanks, Queen Creek, AZ (US); Scott T. Becker, Scotts Valley, CA (US)

(73) Assignee: Tela Innovations, Inc., Los Gatos, CA (US)

( * ) Notice: Subject to any disclaimer, the term of this patent is extended or adjusted under 35 U.S.C. 154(b) by 356 days.

(21) Appl. No.: 12/479,674

(22) Filed: Jun. 5, 2009

(65) Prior Publication Data

US 2009/0300574 A1   Dec. 3, 2009

Related U.S. Application Data

(63) Continuation-in-part of application No. 12/013,342, filed on Jan. 11, 2008, now Pat. No. 7,917,879, and a continuation-in-part of application No. 12/212,562, filed on Sep. 17, 2008, now Pat. No. 7,842,975, which is a continuation of application No. 11/683,402, filed on Mar. 7, 2007, now Pat. No. 7,446,352.

(60) Provisional application No. 61/059,712, filed on Jun. 6, 2008, provisional application No. 60/963,364, filed on Aug. 2, 2007, provisional application No. 60/972,394, filed on Sep. 14, 2007, provisional application No. 60/781,288, filed on Mar. 9, 2006.

(51) Int. Cl.
    *G06F 17/50* (2006.01)

(52) U.S. Cl. ............ 716/53; 716/122; 716/135

(58) Field of Classification Search ............ None
    See application file for complete search history.

(56) References Cited

U.S. PATENT DOCUMENTS 4,197,555 A   4/1980   Uehara et al.
(Continued)

FOREIGN PATENT DOCUMENTS

EP   1394858   3/2004
(Continued)

OTHER PUBLICATIONS

Ha et al., "Reduction in the Mask Error Factor by Optimizing the Diffraction Order of a Scattering Bar in Lithography," Journal of the Korean Physical Society, vol. 46, No. 5, May 2005, pp. 1213-1217.*

(Continued)

*Primary Examiner* — Leigh Garbowski
(74) *Attorney, Agent, or Firm* — Martine Penilla Group, LLP

(57) ABSTRACT

Regular layout shapes are placed in accordance with a virtual grate. A determination is made as to whether an unoccupied layout space adjacent to a regular layout shape to be reinforced, and extending in a direction perpendicular to the regular layout shape, is large enough to support placement of a sub-resolution shape. Upon determining that the unoccupied layout space is large enough to support placement of the sub-resolution shape, the sub-resolution shape is placed so as to be substantially centered upon a virtual line of the virtual grate within the unoccupied layout space. Also, one or more sub-resolution shapes are placed between and parallel with neighboring regular layout shapes when windows of lithographic reinforcement associated with each of the neighboring regular layout shapes permit. The sub-resolution shapes may be placed according to a virtual grate, or may be placed based on proximity to edges of the neighboring regular layout shapes.

25 Claims, 23 Drawing Sheets

U.S. PATENT DOCUMENTS

| | | | |
|---|---|---|---|
| 4,417,161 A | 11/1983 | Uya | |
| 4,424,460 A | 1/1984 | Best | |
| 4,682,202 A | 7/1987 | Tanizawa | |
| 4,801,986 A | 1/1989 | Chang et al. | |
| 5,097,422 A | 3/1992 | Corbin et al. | |
| 5,121,186 A | 6/1992 | Wong et al. | |
| 5,208,765 A | 5/1993 | Turnbull | |
| 5,224,057 A | 6/1993 | Igarashi | |
| 5,242,770 A * | 9/1993 | Chen et al. | 430/5 |
| 5,378,649 A | 1/1995 | Huang | |
| 5,471,403 A | 11/1995 | Fujimaga | |
| 5,497,334 A | 3/1996 | Russell et al. | |
| 5,497,337 A | 3/1996 | Ponnapalli et al. | |
| 5,581,098 A | 12/1996 | Chang | |
| 5,636,002 A * | 6/1997 | Garofalo | 355/53 |
| 5,682,323 A | 10/1997 | Pasch et al. | |
| 5,684,733 A | 11/1997 | Wu et al. | |
| 5,705,301 A | 1/1998 | Garza et al. | |
| 5,723,883 A | 3/1998 | Gheewalla | |
| 5,740,068 A | 4/1998 | Liebmann et al. | |
| 5,745,374 A | 4/1998 | Matsumoto | |
| 5,774,367 A | 6/1998 | Reyes et al. | |
| 5,790,417 A | 8/1998 | Chao et al. | |
| 5,796,624 A | 8/1998 | Sridhar et al. | |
| 5,825,203 A | 10/1998 | Kusunoki et al. | |
| 5,838,594 A | 11/1998 | Kojima | |
| 5,841,663 A | 11/1998 | Sharma et al. | |
| 5,847,421 A | 12/1998 | Yamaguchi | |
| 5,852,562 A | 12/1998 | Shinomiya et al. | |
| 5,858,580 A | 1/1999 | Wang et al. | |
| 5,898,194 A | 4/1999 | Gheewala | |
| 5,900,340 A | 5/1999 | Reich et al. | |
| 5,908,827 A | 6/1999 | Sirna | |
| 5,923,059 A | 7/1999 | Gheewala | |
| 5,929,469 A | 7/1999 | Mimoto et al. | |
| 5,935,763 A | 8/1999 | Caterer et al. | |
| 5,973,507 A | 10/1999 | Yamazaki | |
| 5,977,305 A | 11/1999 | Wigler et al. | |
| 6,009,251 A | 12/1999 | Ho et al. | |
| 6,026,223 A | 2/2000 | Scepanovic et al. | |
| 6,037,617 A | 3/2000 | Kumagai | |
| 6,044,007 A | 3/2000 | Capodieci | |
| 6,063,132 A | 5/2000 | DeCamp et al. | |
| 6,084,437 A | 7/2000 | Sako | |
| 6,091,845 A | 7/2000 | Pierrat et al. | |
| 6,099,584 A | 8/2000 | Arnold et al. | |
| 6,100,025 A | 8/2000 | Wigler et al. | |
| 6,114,071 A * | 9/2000 | Chen et al. | 430/5 |
| 6,166,415 A | 12/2000 | Sakemi et al. | |
| 6,174,742 B1 | 1/2001 | Sudhindranath et al. | |
| 6,182,272 B1 | 1/2001 | Andreev et al. | |
| 6,194,104 B1 | 2/2001 | Hsu | |
| 6,194,252 B1 | 2/2001 | Yamaguchi | |
| 6,194,912 B1 | 2/2001 | Or-Bach | |
| 6,209,123 B1 | 3/2001 | Maziasz et al. | |
| 6,230,299 B1 | 5/2001 | McSherry et al. | |
| 6,232,173 B1 | 5/2001 | Hsu et al. | |
| 6,240,542 B1 | 5/2001 | Kapur | |
| 6,249,902 B1 | 6/2001 | Igusa et al. | |
| 6,255,600 B1 | 7/2001 | Schaper | |
| 6,262,487 B1 | 7/2001 | Igarashi et al. | |
| 6,269,472 B1 | 7/2001 | Garza et al. | |
| 6,275,973 B1 | 8/2001 | Wein | |
| 6,282,696 B1 | 8/2001 | Garza et al. | |
| 6,303,252 B1 * | 10/2001 | Lin | 430/5 |
| 6,331,733 B1 | 12/2001 | Or-Bach et al. | |
| 6,335,250 B1 | 1/2002 | Egi | |
| 6,338,972 B1 | 1/2002 | Sudhindranath et al. | |
| 6,356,112 B1 | 3/2002 | Tran et al. | |
| 6,370,679 B1 | 4/2002 | Chang et al. | |
| 6,378,110 B1 | 4/2002 | Ho | |
| 6,388,296 B1 | 5/2002 | Hsu | |
| 6,393,601 B1 | 5/2002 | Tanaka et al. | |
| 6,415,421 B2 | 7/2002 | Anderson et al. | |
| 6,416,907 B1 | 7/2002 | Winder et al. | |
| 6,421,820 B1 | 7/2002 | Mansfield et al. | |
| 6,425,112 B1 | 7/2002 | Bula et al. | |
| 6,425,117 B1 | 7/2002 | Pasch et al. | |
| 6,426,269 B1 | 7/2002 | Haffner et al. | |
| 6,436,805 B1 | 8/2002 | Trivedi | |
| 6,470,489 B1 | 10/2002 | Chang et al. | |
| 6,476,493 B2 | 11/2002 | Or-Bach et al. | |
| 6,477,695 B1 | 11/2002 | Gandhi | |
| 6,480,989 B2 | 11/2002 | Chan et al. | |
| 6,492,066 B1 | 12/2002 | Capodieci et al. | |
| 6,496,965 B1 | 12/2002 | van Ginneken et al. | |
| 6,505,327 B2 | 1/2003 | Lin | |
| 6,505,328 B1 | 1/2003 | van Ginneken et al. | |
| 6,509,952 B1 | 1/2003 | Govil et al. | |
| 6,514,849 B1 | 2/2003 | Hui et al. | |
| 6,516,459 B1 | 2/2003 | Sahouria | |
| 6,523,156 B2 | 2/2003 | Cirit | |
| 6,525,350 B1 | 2/2003 | Kinoshita et al. | |
| 6,536,028 B1 | 3/2003 | Katsioulas et al. | |
| 6,543,039 B1 | 4/2003 | Watanabe | |
| 6,553,544 B2 | 4/2003 | Tanaka et al. | |
| 6,553,559 B2 | 4/2003 | Liebmann et al. | |
| 6,553,562 B2 | 4/2003 | Capodieci et al. | |
| 6,571,140 B1 | 5/2003 | Wewalaarachchi et al. | |
| 6,571,379 B2 | 5/2003 | Takayama | |
| 6,578,190 B2 | 6/2003 | Ferguson et al. | |
| 6,588,005 B1 | 7/2003 | Kobayashi et al. | |
| 6,590,289 B2 | 7/2003 | Shively | |
| 6,591,207 B2 | 7/2003 | Naya et al. | |
| 6,609,235 B2 | 8/2003 | Ramaswamy et al. | |
| 6,610,607 B1 | 8/2003 | Armbrust et al. | |
| 6,620,561 B2 | 9/2003 | Winder et al. | |
| 6,633,182 B2 | 10/2003 | Pileggi et al. | |
| 6,635,935 B2 | 10/2003 | Makino | |
| 6,643,831 B2 | 11/2003 | Chang et al. | |
| 6,650,014 B2 | 11/2003 | Kariyazaki | |
| 6,661,041 B2 | 12/2003 | Keeth | |
| 6,662,350 B2 | 12/2003 | Fried et al. | |
| 6,673,638 B1 | 1/2004 | Bendik et al. | |
| 6,687,895 B2 | 2/2004 | Zhang | |
| 6,691,297 B1 | 2/2004 | Misaka et al. | |
| 6,700,405 B1 | 3/2004 | Hirairi | |
| 6,703,170 B1 | 3/2004 | Pindo | |
| 6,714,903 B1 | 3/2004 | Chu et al. | |
| 6,732,338 B2 | 5/2004 | Crouse et al. | |
| 6,737,199 B1 | 5/2004 | Hsieh | |
| 6,737,347 B1 | 5/2004 | Houston et al. | |
| 6,745,372 B2 | 6/2004 | Cote et al. | |
| 6,745,380 B2 * | 6/2004 | Bodendorf et al. | 716/53 |
| 6,749,972 B2 | 6/2004 | Yu | |
| 6,760,269 B2 | 7/2004 | Nakase et al. | |
| 6,765,245 B2 | 7/2004 | Bansal | |
| 6,777,138 B2 | 8/2004 | Pierrat et al. | |
| 6,777,146 B1 * | 8/2004 | Samuels | 430/30 |
| 6,789,244 B1 | 9/2004 | Dasasathyan et al. | |
| 6,789,246 B1 | 9/2004 | Mohan et al. | |
| 6,792,593 B2 | 9/2004 | Takashima et al. | |
| 6,794,914 B2 | 9/2004 | Sani et al. | |
| 6,795,952 B1 | 9/2004 | Stine et al. | |
| 6,795,953 B2 | 9/2004 | Bakarian et al. | |
| 6,807,663 B2 | 10/2004 | Cote et al. | |
| 6,819,136 B2 | 11/2004 | Or-Bach | |
| 6,826,738 B2 | 11/2004 | Cadouri | |
| 6,834,375 B1 | 12/2004 | Stine et al. | |
| 6,841,880 B2 | 1/2005 | Matsumoto et al. | |
| 6,850,854 B2 | 2/2005 | Naya et al. | |
| 6,854,096 B2 | 2/2005 | Eaton et al. | |
| 6,854,100 B1 | 2/2005 | Chuang et al. | |
| 6,877,144 B1 | 4/2005 | Rittman et al. | |
| 6,884,712 B2 | 4/2005 | Yelehanka et al. | |
| 6,898,770 B2 | 5/2005 | Boluki et al. | |
| 6,904,582 B1 | 6/2005 | Rittman et al. | |
| 6,918,104 B2 | 7/2005 | Pierrat et al. | |
| 6,920,079 B2 | 7/2005 | Shibayama | |
| 6,928,635 B2 | 8/2005 | Pramanik et al. | |
| 6,931,617 B2 | 8/2005 | Sanie et al. | |
| 6,953,956 B2 | 10/2005 | Or-Bach et al. | |
| 6,954,918 B2 | 10/2005 | Houston | |
| 6,957,402 B2 | 10/2005 | Templeton et al. | |
| 6,968,527 B2 | 11/2005 | Pierrat | |
| 6,978,436 B2 | 12/2005 | Cote et al. | |
| 6,978,437 B1 | 12/2005 | Rittman et al. | |

| Patent | Date | Inventor |
|---|---|---|
| 6,992,394 B2 | 1/2006 | Park |
| 6,992,925 B2 | 1/2006 | Peng |
| 6,993,741 B2 | 1/2006 | Liebmann et al. |
| 6,994,939 B1 * | 2/2006 | Ghandehari et al. ............... 430/5 |
| 7,016,214 B2 | 3/2006 | Kawamata |
| 7,028,285 B2 | 4/2006 | Cote et al. |
| 7,041,568 B2 | 5/2006 | Goldbach et al. |
| 7,052,972 B2 | 5/2006 | Sandhu et al. |
| 7,063,920 B2 | 6/2006 | Baba-Ali |
| 7,064,068 B2 | 6/2006 | Chou et al. |
| 7,065,731 B2 | 6/2006 | Jacques et al. |
| 7,079,989 B2 | 7/2006 | Wimer |
| 7,093,208 B2 | 8/2006 | Williams et al. |
| 7,093,228 B2 | 8/2006 | Andreev et al. |
| 7,103,870 B2 | 9/2006 | Misaka et al. |
| 7,105,871 B2 | 9/2006 | Or-Bach et al. |
| 7,107,551 B1 | 9/2006 | de Dood et al. |
| 7,115,343 B2 * | 10/2006 | Gordon et al. ..................... 430/5 |
| 7,115,920 B2 | 10/2006 | Bernstein et al. |
| 7,120,882 B2 | 10/2006 | Kotani et al. |
| 7,124,386 B2 | 10/2006 | Smith et al. |
| 7,132,203 B2 | 11/2006 | Pierrat |
| 7,137,092 B2 | 11/2006 | Maeda |
| 7,149,999 B2 | 12/2006 | Kahng et al. |
| 7,152,215 B2 | 12/2006 | Smith et al. |
| 7,155,685 B2 | 12/2006 | Mori et al. |
| 7,155,689 B2 | 12/2006 | Pierrat |
| 7,159,197 B2 | 1/2007 | Falbo et al. |
| 7,174,520 B2 | 2/2007 | White et al. |
| 7,175,940 B2 | 2/2007 | Laidig et al. |
| 7,185,294 B2 | 2/2007 | Zhang |
| 7,188,322 B2 | 3/2007 | Cohn et al. |
| 7,194,712 B2 | 3/2007 | Wu |
| 7,200,835 B2 * | 4/2007 | Zhang et al. .................... 716/54 |
| 7,202,517 B2 | 4/2007 | Dixit et al. |
| 7,219,326 B2 | 5/2007 | Reed et al. |
| 7,225,423 B2 | 5/2007 | Bhattacharya et al. |
| 7,227,183 B2 | 6/2007 | Donze et al. |
| 7,231,628 B2 | 6/2007 | Pack et al. |
| 7,235,424 B2 | 6/2007 | Chen et al. |
| 7,243,316 B2 | 7/2007 | White et al. |
| 7,252,909 B2 | 8/2007 | Shin et al. |
| 7,264,990 B2 | 9/2007 | Rueckes et al. |
| 7,278,118 B2 | 10/2007 | Pileggi et al. |
| 7,287,320 B2 | 10/2007 | Wang et al. |
| 7,294,534 B2 | 11/2007 | Iwaki |
| 7,302,651 B2 | 11/2007 | Allen et al. |
| 7,308,669 B2 | 12/2007 | Buehler et al. |
| 7,335,966 B2 | 2/2008 | Ihme et al. |
| 7,337,421 B2 | 2/2008 | Kamat |
| 7,338,896 B2 | 3/2008 | Vanhaelemeersch et al. |
| 7,346,885 B2 * | 3/2008 | Semmler ........................ 716/52 |
| 7,350,183 B2 | 3/2008 | Cui et al. |
| 7,353,492 B2 | 4/2008 | Gupta et al. |
| 7,360,179 B2 | 4/2008 | Smith et al. |
| 7,360,198 B2 | 4/2008 | Rana et al. |
| 7,366,997 B1 | 4/2008 | Rahmat et al. |
| 7,367,008 B2 | 4/2008 | White et al. |
| 7,376,931 B2 | 5/2008 | Kokubun |
| 7,383,521 B2 | 6/2008 | Smith et al. |
| 7,397,260 B2 | 7/2008 | Chanda et al. |
| 7,400,627 B2 | 7/2008 | Wu et al. |
| 7,404,173 B2 | 7/2008 | Wu et al. |
| 7,411,252 B2 | 8/2008 | Anderson et al. |
| 7,421,678 B2 | 9/2008 | Barnes et al. |
| 7,423,298 B2 | 9/2008 | Mariyama et al. |
| 7,424,694 B2 | 9/2008 | Ikeda |
| 7,426,710 B2 | 9/2008 | Zhang et al. |
| 7,434,185 B2 | 10/2008 | Dooling et al. |
| 7,441,211 B1 | 10/2008 | Gupta et al. |
| 7,444,609 B2 | 10/2008 | Charlebois et al. |
| 7,446,352 B2 | 11/2008 | Becker et al. |
| 7,449,371 B2 | 11/2008 | Kemerling et al. |
| 7,458,045 B2 | 11/2008 | Cote et al. |
| 7,459,792 B2 | 12/2008 | Chen |
| 7,465,973 B2 | 12/2008 | Chang et al. |
| 7,466,607 B2 | 12/2008 | Hollis et al. |
| 7,480,880 B2 | 1/2009 | Visweswariah et al. |
| 7,480,891 B2 * | 1/2009 | Sezginer ........................ 716/50 |
| 7,484,197 B2 | 1/2009 | Allen et al. |
| 7,487,475 B1 | 2/2009 | Kriplani et al. |
| 7,506,300 B2 | 3/2009 | Sezginer et al. |
| 7,509,621 B2 | 3/2009 | Melvin, III |
| 7,509,622 B2 | 3/2009 | Sinha et al. |
| 7,512,921 B2 | 3/2009 | Shibuya |
| 7,514,959 B2 | 4/2009 | Or-Bach et al. |
| 7,523,429 B2 | 4/2009 | Kroyan et al. |
| 7,527,900 B2 | 5/2009 | Zhou et al. |
| 7,563,701 B2 | 7/2009 | Chang et al. |
| 7,568,174 B2 | 7/2009 | Sezginer et al. |
| 7,569,310 B2 * | 8/2009 | Wallace et al. ................... 430/5 |
| 7,614,030 B2 * | 11/2009 | Hsu ............................... 716/50 |
| 7,632,610 B2 * | 12/2009 | Wallace et al. ................... 430/5 |
| 7,665,051 B2 | 2/2010 | Ludwig et al. |
| 7,712,056 B2 | 5/2010 | White et al. |
| 7,770,144 B2 | 8/2010 | Dellinger |
| 7,802,219 B2 | 9/2010 | Tomar et al. |
| 7,825,437 B2 | 11/2010 | Pillarisetty et al. |
| 7,842,975 B2 | 11/2010 | Becker et al. |
| 7,882,456 B2 | 2/2011 | Zach |
| 7,888,705 B2 | 2/2011 | Becker et al. |
| 7,898,040 B2 | 3/2011 | Nawaz |
| 7,908,578 B2 | 3/2011 | Becker et al. |
| 7,910,958 B2 | 3/2011 | Becker et al. |
| 7,917,877 B2 | 3/2011 | Singh et al. |
| 7,917,879 B2 | 3/2011 | Becker et al. |
| 7,923,266 B2 | 4/2011 | Thijs et al. |
| 7,923,337 B2 | 4/2011 | Chang et al. |
| 7,932,545 B2 | 4/2011 | Becker et al. |
| 7,962,867 B2 | 6/2011 | White et al. |
| 7,964,267 B1 | 6/2011 | Lyons et al. |
| 7,971,160 B2 * | 6/2011 | Osawa et al. ................... 716/55 |
| 7,992,122 B1 | 8/2011 | Burstein et al. |
| 7,994,583 B2 | 8/2011 | Inaba |
| 8,004,042 B2 | 8/2011 | Yang et al. |
| 8,058,671 B2 | 11/2011 | Becker et al. |
| 2002/0015899 A1 | 2/2002 | Chen et al. |
| 2002/0079927 A1 | 6/2002 | Katoh et al. |
| 2002/0166107 A1 | 11/2002 | Capodieci et al. |
| 2003/0042930 A1 | 3/2003 | Pileggi et al. |
| 2003/0046653 A1 | 3/2003 | Liu |
| 2003/0061592 A1 | 3/2003 | Agrawal et al. |
| 2003/0088839 A1 | 5/2003 | Watanabe |
| 2003/0088842 A1 | 5/2003 | Cirit |
| 2003/0106037 A1 | 6/2003 | Moniwa et al. |
| 2003/0145299 A1 | 7/2003 | Fried et al. |
| 2003/0177465 A1 | 9/2003 | MacLean et al. |
| 2003/0229868 A1 | 12/2003 | White et al. |
| 2003/0229875 A1 | 12/2003 | Smith et al. |
| 2004/0049754 A1 | 3/2004 | Liao et al. |
| 2004/0063038 A1 | 4/2004 | Shin et al. |
| 2004/0115539 A1 | 6/2004 | Broeke et al. |
| 2004/0139412 A1 | 7/2004 | Ito et al. |
| 2004/0145028 A1 | 7/2004 | Matsumoto et al. |
| 2004/0153979 A1 | 8/2004 | Chang |
| 2004/0161878 A1 | 8/2004 | Or-Bach et al. |
| 2004/0229135 A1 * | 11/2004 | Wang et al. ..................... 430/5 |
| 2004/0243966 A1 | 12/2004 | Dellinger |
| 2005/0055828 A1 | 3/2005 | Wang et al. |
| 2005/0087806 A1 | 4/2005 | Hokazono |
| 2005/0093147 A1 | 5/2005 | Tu |
| 2005/0101112 A1 | 5/2005 | Rueckes et al. |
| 2005/0136340 A1 | 6/2005 | Baselmans et al. |
| 2005/0138598 A1 | 6/2005 | Kokubun |
| 2005/0185325 A1 | 8/2005 | Hur |
| 2005/0189614 A1 | 9/2005 | Ihme et al. |
| 2005/0196685 A1 | 9/2005 | Wang et al. |
| 2005/0224982 A1 | 10/2005 | Kemerling et al. |
| 2005/0229130 A1 | 10/2005 | Wu et al. |
| 2005/0251771 A1 | 11/2005 | Robles |
| 2005/0268256 A1 | 12/2005 | Tsai et al. |
| 2006/0063334 A1 | 3/2006 | Donze et al. |
| 2006/0070018 A1 | 3/2006 | Semmler |
| 2006/0084261 A1 | 4/2006 | Iwaki |
| 2006/0101370 A1 | 5/2006 | Cui et al. |
| 2006/0112355 A1 | 5/2006 | Pileggi et al. |
| 2006/0121715 A1 | 6/2006 | Chang et al. |
| 2006/0125024 A1 | 6/2006 | Ishigaki |

| | | |
|---|---|---|
| 2006/0151810 A1 | 7/2006 | Ohshige |
| 2006/0158270 A1 | 7/2006 | Gibet et al. |
| 2006/0177744 A1 | 8/2006 | Bodendorf et al. |
| 2006/0181310 A1 | 8/2006 | Rhee |
| 2006/0197557 A1 | 9/2006 | Chung |
| 2006/0206854 A1 | 9/2006 | Barnes et al. |
| 2006/0223302 A1 | 10/2006 | Chang et al. |
| 2006/0248495 A1* | 11/2006 | Sezginer .................. 716/19 |
| 2007/0038973 A1 | 2/2007 | Li et al. |
| 2007/0074145 A1 | 3/2007 | Tanaka |
| 2007/0094634 A1 | 4/2007 | Seizginer et al. |
| 2007/0101305 A1 | 5/2007 | Smith et al. |
| 2007/0105023 A1 | 5/2007 | Zhou et al. |
| 2007/0106971 A1 | 5/2007 | Lien et al. |
| 2007/0113216 A1 | 5/2007 | Zhang |
| 2007/0196958 A1 | 8/2007 | Bhattacharya et al. |
| 2007/0209029 A1 | 9/2007 | Ivonin et al. |
| 2007/0210391 A1 | 9/2007 | Becker |
| 2007/0234252 A1 | 10/2007 | Visweswariah et al. |
| 2007/0256039 A1 | 11/2007 | White |
| 2007/0274140 A1 | 11/2007 | Joshi et al. |
| 2007/0290361 A1 | 12/2007 | Chen |
| 2007/0294652 A1 | 12/2007 | Bowen |
| 2008/0005712 A1 | 1/2008 | Charlebois et al. |
| 2008/0046846 A1 | 2/2008 | Chew et al. |
| 2008/0082952 A1* | 4/2008 | O'Brien .................. 716/19 |
| 2008/0086712 A1 | 4/2008 | Fujimoto |
| 2008/0097641 A1 | 4/2008 | Miyashita et al. |
| 2008/0098334 A1 | 4/2008 | Pileggi et al. |
| 2008/0099795 A1 | 5/2008 | Bernstein et al. |
| 2008/0127029 A1 | 5/2008 | Graur et al. |
| 2008/0134128 A1 | 6/2008 | Blatchford et al. |
| 2008/0144361 A1 | 6/2008 | Wong |
| 2008/0148216 A1 | 6/2008 | Chan et al. |
| 2008/0163141 A1 | 7/2008 | Scheffer et al. |
| 2008/0168406 A1 | 7/2008 | Rahmat et al. |
| 2008/0216207 A1 | 9/2008 | Tsai |
| 2008/0244494 A1 | 10/2008 | McCullen |
| 2008/0276105 A1 | 11/2008 | Hoberman et al. |
| 2008/0283910 A1 | 11/2008 | Dreeskornfeld et al. |
| 2008/0308848 A1 | 12/2008 | Inaba |
| 2009/0014811 A1 | 1/2009 | Becker |
| 2009/0024974 A1 | 1/2009 | Yamada |
| 2009/0031261 A1 | 1/2009 | Smith et al. |
| 2009/0032898 A1 | 2/2009 | Becker |
| 2009/0032967 A1 | 2/2009 | Becker |
| 2009/0037864 A1 | 2/2009 | Becker |
| 2009/0077524 A1 | 3/2009 | Nagamura |
| 2009/0101940 A1 | 4/2009 | Barrows et al. |
| 2009/0106714 A1 | 4/2009 | Culp et al. |
| 2009/0155990 A1 | 6/2009 | Yanagidaira et al. |
| 2009/0181314 A1 | 7/2009 | Shyu et al. |
| 2009/0187871 A1 | 7/2009 | Cork |
| 2009/0224408 A1 | 9/2009 | Fox |
| 2009/0228853 A1 | 9/2009 | Hong et al. |
| 2009/0280582 A1 | 11/2009 | Thijs et al. |
| 2009/0302372 A1 | 12/2009 | Chang et al. |
| 2010/0001321 A1 | 1/2010 | Becker |
| 2010/0006897 A1 | 1/2010 | Becker |
| 2010/0006898 A1 | 1/2010 | Becker |
| 2010/0006899 A1 | 1/2010 | Becker |
| 2010/0006900 A1 | 1/2010 | Becker |
| 2010/0006901 A1 | 1/2010 | Becker |
| 2010/0006902 A1 | 1/2010 | Becker |
| 2010/0006903 A1 | 1/2010 | Becker |
| 2010/0006947 A1 | 1/2010 | Becker |
| 2010/0006948 A1 | 1/2010 | Becker |
| 2010/0006950 A1 | 1/2010 | Becker |
| 2010/0006951 A1 | 1/2010 | Becker |
| 2010/0006986 A1 | 1/2010 | Becker |
| 2010/0011327 A1 | 1/2010 | Becker |
| 2010/0011328 A1 | 1/2010 | Becker |
| 2010/0011329 A1 | 1/2010 | Becker |
| 2010/0011330 A1 | 1/2010 | Becker |
| 2010/0011331 A1 | 1/2010 | Becker |
| 2010/0011332 A1 | 1/2010 | Becker |
| 2010/0011333 A1 | 1/2010 | Becker |
| 2010/0012981 A1 | 1/2010 | Becker |
| 2010/0012982 A1 | 1/2010 | Becker |
| 2010/0012983 A1 | 1/2010 | Becker |
| 2010/0012984 A1 | 1/2010 | Becker |
| 2010/0012985 A1 | 1/2010 | Becker |
| 2010/0012986 A1 | 1/2010 | Becker |
| 2010/0017766 A1 | 1/2010 | Becker |
| 2010/0017767 A1 | 1/2010 | Becker |
| 2010/0017768 A1 | 1/2010 | Becker |
| 2010/0017769 A1 | 1/2010 | Becker |
| 2010/0017770 A1 | 1/2010 | Becker |
| 2010/0017771 A1 | 1/2010 | Becker |
| 2010/0017772 A1 | 1/2010 | Becker |
| 2010/0019280 A1 | 1/2010 | Becker |
| 2010/0019281 A1 | 1/2010 | Becker |
| 2010/0019282 A1 | 1/2010 | Becker |
| 2010/0019283 A1 | 1/2010 | Becker |
| 2010/0019284 A1 | 1/2010 | Becker |
| 2010/0019285 A1 | 1/2010 | Becker |
| 2010/0019286 A1 | 1/2010 | Becker |
| 2010/0019287 A1 | 1/2010 | Becker |
| 2010/0019288 A1 | 1/2010 | Becker |
| 2010/0019308 A1 | 1/2010 | Chan et al. |
| 2010/0023906 A1 | 1/2010 | Becker |
| 2010/0023907 A1 | 1/2010 | Becker |
| 2010/0023908 A1 | 1/2010 | Becker |
| 2010/0023911 A1 | 1/2010 | Becker |
| 2010/0025731 A1 | 2/2010 | Becker |
| 2010/0025732 A1 | 2/2010 | Becker |
| 2010/0025733 A1 | 2/2010 | Becker |
| 2010/0025734 A1 | 2/2010 | Becker |
| 2010/0025735 A1 | 2/2010 | Becker |
| 2010/0025736 A1 | 2/2010 | Becker |
| 2010/0032721 A1 | 2/2010 | Becker |
| 2010/0032722 A1 | 2/2010 | Becker |
| 2010/0032723 A1 | 2/2010 | Becker |
| 2010/0032724 A1 | 2/2010 | Becker |
| 2010/0032726 A1 | 2/2010 | Becker |
| 2010/0037194 A1 | 2/2010 | Becker |
| 2010/0037195 A1 | 2/2010 | Becker |
| 2010/0096671 A1 | 4/2010 | Becker |
| 2010/0203689 A1 | 8/2010 | Bernstein et al. |
| 2010/0232212 A1 | 9/2010 | Anderson et al. |
| 2010/0264468 A1 | 10/2010 | Xu |
| 2010/0287518 A1 | 11/2010 | Becker |
| 2011/0108890 A1 | 5/2011 | Becker et al. |
| 2011/0108891 A1 | 5/2011 | Becker et al. |
| 2011/0154281 A1 | 6/2011 | Zach |
| 2011/0207298 A1 | 8/2011 | Anderson et al. |
| 2011/0260253 A1 | 10/2011 | Inaba |
| 2012/0012932 A1 | 1/2012 | Perng et al. |

FOREIGN PATENT DOCUMENTS

| | | |
|---|---|---|
| EP | 1670062 | 6/2006 |
| FR | 2860920 | 4/2005 |
| JP | 10-116911 | 5/1998 |
| JP | 2002-258463 | 9/2002 |
| KR | 10-2000-0028830 A | 5/2000 |
| KR | 10-2005-0030347 A | 3/2005 |
| WO | WO 2005/104356 | 11/2005 |
| WO | WO 2006/014849 | 2/2006 |
| WO | WO 2006/052738 | 5/2006 |
| WO | WO 2007/103587 | 9/2007 |

OTHER PUBLICATIONS

Liebmann et al., "Optimizing Style Options for Sub-Resolution Assist Features," Proc. of SPIE vol. 4346, 2001, pp. 141-152.*
Mansfield et al., "Lithograhic Comparison of Assist Feature Design Strategies," Proc. of SPIE vol. 4000, 2000, pp. 63-76.*
Shi et al., "Understanding the Forbidden Pitch and Assist Feature Placement," Proc. of SPIE vol. 4562, 2002, pp. 968-979.*
U.S. Appl. No. 60/625,342, filed May 25, 2006, Pileggi et al.
Acar, et al., "A Linear-Centric Simulation Framework for Parametric Fluctuations", 2002, IEEE, Carnegie Mellon University USA, pp. 1-8.
Amazawa, et al., "Fully Planarized Four-Level Interconnection with Stacked VLAS Using CMP of Selective CVD-A1 and Insulator and its Application to Quarter Micron Gate Array LSIs", 1995, IEEE, Japan, pp. 473-476.

Axelrad et al. "Efficient Full-Chip Yield Analysis Methodology for OPC-Corrected VLSI Design", 2000, International Symposium on Quality Electronic Design (ISQED) , 7 pages.

Balasinski et al. "Impact of Subwavelength CD Tolerance on Device Performance", 2002, SPIE , 8 pages.

Burkhardt, et al., "Dark Field Double Dipole Lithography (DDL) for Back-End-of-Line Processes", 2007, SPIE Proceeding Series, vol. 6520; 65200K , 10 pages.

Capetti, et al., "Sub k1=0.25 Lithography with Double Patterning Technique for 45nm Technology Node Flash Memory Devices at λ=193nm", 2007, SPIE Proceeding Series, vol. 6520; 65202K , 12 pages.

Chandra, et al., "An Interconnect Channel Design Methodology for High Performance Integrated Circuits", 2004, IEEE, Carnegie Mellon University, pp. 1-6.

Cheng, et al., "Feasibility Study of Splitting Pitch Technology on 45nm Contact Patterning with 0.93 NA", 2007, SPIE Proceeding Series, vol. 6520; 65202N , 8 pages.

Chow, et al., "The Design of a SRAM-Based Field-Programmable Gate Array—Part II: Circuit Design and Layout", 1999, IEEE, vol. 7 # 3 pp. 321-330.

Clark et al. "Managing Standby and Active Mode Leakage Power in Deep Sub-Micron Design", Aug. 9-11, 2004, ACM, pp. 274-279.

Cobb et al. "Using OPC to Optimize for Image Slope and Improve Process Window", 2003, SPIE , pp. 838-846.

Devgan "Leakage Issues in IC Design: Part 3", 2003, CCAD , 74 pages.

DeVOR, et al., "Statistical Quality Design and Control", 1992, Macmillan Publishing Company, pp. 264-267.

Dusa, et al. "Pitch Doubling Through Dual Patterning Lithography Challenges in Integration and Litho Budgets", 2007, SPIE Proceeding Series, vol. 6520; 65200G, 10 pages.

El-Gamal, "Fast, Cheap and Under Control: The Next Implementation Fabric", Jun. 2-6, 2003, ACM Press, pp. 354-355.

Frankel, "Quantum State Control Interference Lithography and Trim Double Patterning for 32-16nm Lithography", 2007, SPIE Proceeding Series, vol. 6520; 65202L , 8 pages.

Garg, et al. " Lithography Driven Layout Design", 2005, IEEE , 6 pages.

Grobman et al. "Reticle Enhancement Technology Trends: Resource and Manufacturability Implications for the Implementation of Physical Designs" Apr. 1-4, 2001, ACM , pp. 45-51.

Grobman et al. "Reticle Enhancement Technology: Implications and Challenges for Physical Design" Jun. 18-22, 2001, ACM , pp. 73-78.

Gupta et al. "Enhanced Resist and Etch CD Control by Design Perturbation", Oct. 4-7, 2006, Society of Photo-Optical Instrumentation Engineers , 12 pages.

Gupta et al. "A Practical Transistor-Level Dual Threshold Voltage Assignment Methodology", 2005, Sixth International Symposium on Quality Electronic Design (ISQED) , 6 pages.

Gupta et al. "Detailed Placement for Improved Depth of Focus and CD Control", 2005, ACM , 6 pages.

Gupta et al. "Joining the Design and Mask Flows for Better and Cheaper Masks", Oct. 14-17, 2004, Society of Photo-Optical Instrumentation Engineers, 12 pages.

Gupta et al. "Selective Gate-Length Biasing for Cost-Effective Runtime Leakage Control", Jun. 7-11, 2004, ACM , pp. 327-330.

Gupta et al. "Wafer Topography-Aware Optical Proximity Correction for Better DOF Margin and CD Control", Apr. 13-15, 2005, SPIE , 11 pages.

Hayashida, et al., "Manufacturable Local Interconnect technology Fully Compatible with Titanium Salicide Process", Jun. 11-12, 1991, VMIC Conference , pp. 332-334.

Heng, et al., "A VLSI Artwork Legalization Technique Base on a New Criterion of Minimum Layout Perturbation", 1997, ACM Press, pp. 116-121.

Heng, et al., "Toward Through-Process Layout Quality Metrics", Mar. 3-4, 2005, Society of Photo-Optical Instrumentation Engineers , 7 pages.

Hu, et al., "Synthesis and Placement Flow for Gain-Based Programmable Regular Fabrics", Apr. 6-9, 2003, ACM Press, pp. 197-203.

Hutton, et al., "A Methodology for FPGA to Structured-ASIC Synthesis and Verification", 2006, EDAA, pp. 64-69.

Intel Core Microarchitecture White Paper "Introducing the 45 nm Next-Generation Intel Core Microarchitecture," 2007, Intel Corporation., pp. 1-7.

Jayakumar, et al., "A Metal and VIA Maskset Programmable VLSI Design Methodology using PLAs", 2004, IEEE, pp. 590-594.

Jhaveri, T. et al., Maximization of Layout Printability/Manufacturability by Extreme Layout Regularity, Proc. of the SPIE, Apr. 2006 , 15 pages.

Kang, S.M., Metal-Metal Matrix (M3) for High-Speed MOS VLSI Layout, IEEE Trans. on CAD, vol. CAD-6, No. 5, Sep. 1987 , pp. 886-891.

Kheterpal, et al., "Design Methodology for IC Manufacturability Based on Regular Logic-Bricks", DAC, Jun. 13-17, 2005, IEEE/AMC, vol. 6520, pp. 353-358.

Kheterpal, et al., "Routing Architecture Exploration for Regular Fabrics", DAC, Jun. 7-11, 2004, ACM Press, pp. 204-207.

Kim, et al., "Double Exposure Using 193nm Negative Tone Photoresist", 2007, SPIE Proceeding Series, vol. 6520; 65202M, 8 pages.

Kim, et al., "Issues and Challenges of Double Patterning Lithography in DRAM", 2007, SPIE Proceeding Series, vol. 6520; 65200H , 7 pages.

Koorapaty, et al., "Exploring Logic Block Granularity for Regular Fabrics", 2004, IEEE, pp. 1-6.

Koorapaty, et al., "Heterogeneous Logic Block Architectures for Via-Patterned Programmable Fabric", 13th International Conference on Field Programmable Logic and Applications (FPL) 2003, Lecture Notes in Computer Science (LNCS), Sep. 2003, Springer-Verlag, vol. 2778, pp. 426-436.

Koorapaty, et al., "Modular, Fabric-Specific Synthesis for Programmable Architectures", 12th International Conference on Field Programmable Logic and Applications (FPL_2002, Lecture Notes in Computer Science (LNCS)), Sep. 2002, Springer-Verlag, vol. 2438 pp. 132-141.

Lavin et al. "Backend DAC Flows for "Restrictive Design Rules"", 2004, IEEE, pp. 739-746.

Li, et al., "A Linear-Centric Modeling Approach to Harmonic Balance Analysis", 2002, IEEE, pp. 1-6.

Li, et al., "Nonlinear Distortion Analysis Via Linear-Centric Models", 2003, IEEE, pp. 897-903.

Liebmann et al., "Integrating DfM Components Into a Cohesive Design-to-Silicon Solution", IBM Systems and Technology Group, b IBM Research, pp. 1-12.

Liebmann, et al., "High-Performance Circuit Design for the RET-Enabled 65nm Technology Node", Feb. 26-27, 2004, SPIE Proceeding Series, vol. 5379 pp. 20-29.

Liebmann, L. W.,"Layout Impact of Resolution Enhancement Techniques: Impediment or Opportunity?,"International Symposium on Physical Design, 2003, pp. 110-117.

Liu, et al., "Double Patterning with Multilayer Hard Mask Shrinkage for Sub-0.25 k1 Lithography", 200, SPIE Proceeding Series, vol. 6520; 65202J , 8 pages.

Miller, "Manufacturing-Aware Design Helps Boost IC Yield", Sep. 9, 2004, http://www.eetimes.com/showArticle.jhtml?articleID=47102054, 6 pages.

Mo, et al., "Checkerboard: A Regular Structure and its Synthesis," International Workshop on Logic and Synthesis, 2003, Department of Electrical Engineering and Computer Sciences, UC Berkeley, California, pp. 1-7.

Mo, et al., "PLA-Based Regular Structures and Their Synthesis", 2003, Department of Electrical Engineering and Computer Sciences, IEEE, pp. 723-729.

Mo, et al., "Regular Fabrics in Deep Sub-Micron Integrated-Circuit Design", 2004, Kluwer Academic Publishers, cover and copyright info.

Moore, Samuel K., "Intel 45-nanometer Penryn Processors Arrive," Nov. 13, 2007, IEEE Spectrum, http://spectrum.ieee.org/semiconductors/design/intel-45nanometer-penryn-processors-arrive, 1 page.

Mutoh et al. "1-V Power Supply High-Speed Digital Circuit Technology with Multithreshold-Voltage CMOS", 1995, IEEE , pp. 847-854.

Op de Beek, et al., "Manufacturability issues with Double Patterning for 50nm half pitch damascene applications, using RELACS® shrink and corresponding OPC", 2007, SPIE Proceeding Series, vol. 6520; 65200I, 13 pages.
Or-Bach, "Programmable Circuit Fabrics", Sep. 18, 2001, e-ASIC, pp. 1-36.
Otten, et al., "Planning for Performance", DAC 1998, ACM Inc., pp. 122-127.
Pack et al. "Physical & Timing Verification of Subwavelength-Scale Designs-Part I: Lithography Impact on MOSFETs", 2003, SPIE, pp. 51-62.
Pandini, et al., "Congestion-Aware Logic Synthesis", 2002, IEEE, pp. 1-8.
Pandini, et al., "Understanding and Addressing the Impact of Wiring Congestion During Technology Mapping", ISPD Apr. 7-10, 2002, ACM Press, pp. 131-136.
Patel, et al., "An Architectural Exploration of Via Patterned Gate Arrays, ISPD 2003", Apr. 6, 2003, pp. 184-189.
Pileggi, et al., "Exploring Regular Fabrics to Optimize the Perfoimance-Cost Trade-Offs, Proceedings of the 40th ACM/IEEE Design Automation Conference (DAC) 2003", Jun. 2003, ACM Press, pp. 782-787.
Poonawala, et al., "ILT for Double Exposure Lithography with Conventional and Novel Materials", 2007, SPIE Proceeding Series, vol. 6520; 65202Q, 14 pages.
Qian et al. "Advanced Physical Models for Mask Data Verification and Impacts on Physical Layout Synthesis" 2003. IEEE, 6 pages.
Ran, et al., "An Integrated Design Flow for a Via-Configurable Gate Array", 2004, IEEE, pp. 582-589.
Ran, et al., "Designing a Via-Configurable Regular Fabric", Custom Integrated Circuits Conference (CICC). Proceedings of the IEEE, Oct. 1, 2004, pp. 423-426.
Ran, et al., "On Designing Via-Configurable Cell Blocks for Regular Fabrics" Proceedings of the Design Automation Conference (DAC) 2004, Jun. 2004, ACM Press, s 198-203.
Ran, et al., "The Magic of a Via-Configurable Regular Fabric", Proceedings of the IEEE International Conference on Computer Design (ICCD) Oct. 2004, 6 pages.
Ran, et al., "Via-Configurable Routing Architectures and Fast Design Mappability Estimation for Regular Fabrics", 2005, IEEE, pp. 25-32.
Reis, et al., "Physical Design Methodologies for Performance Predictability and Manufacturability", Apr. 14-16, 2004, ACM Press, pp. 390-397.
Robertson, et al., "The Modeling of Double Patterning Lithographic Processes", 2007, SPIE Proceeding Series, vol. 6520; 65200J, 12 pages.
Rovner, "Design for Manufacturability in Via Programmable Gate Arrays", May 2003, Graduate School of Carnegie Mellon University, pp. 1-38.
Sengupta, "An Integrated CAD Framework Linking VLSI Layout Editors and Process Simulators", 1998, Thesis for Rice University, pp. 1-101.
Sengupta, et al., "An Integrated CAD Framework Linking VLSI Layout Editors and Process Simulators", 1996, SPIE Proceeding Series, vol. 2726; pp. 244-252.
Sherlekar, "Design Considerations for Regular Fabrics", Apr. 18-21, 2004, ACM Press, pp. 97-102.
Sreedhar et al. " Statistical Yield Modeling for Sub-Wavelength Lithography", 2008, IEEE, pp. 1-8.
Stapper, "Modeling of Defects in Integrated Circuit Photolithographic Patterns", Jul. 1, 1984, IBM, vol. 28 # 4, pp. 461-475.
Taylor, et al., "Enabling Energy Efficiency in Via-Patterned Gate Array Devices", Jun. 7-11, 2004, ACM Press, pp. 874-877.
Tian et al. "Model-Based Dummy Feature Placement for Oxide Chemical Mechanical Polishing Manufacturability" 2000, ACM, pp. 667-670.
Tong, et al., "Regular Logic Fabrics for a Via Patterned Gate Array (VPGA), Custom Integrated Circuits Conference", Sep. 2003, Proceedings of the IEEE, pp. 53-56.
Vanleenhove, et al., "A Litho-Only Approach to Double Patterning", 2007, SPIE Proceeding Series, vol. 6520; 65202F, 10 pages.
Wang, et al., "Performance Optimization for Gridded-Layout Standard Cells", 2004, vol. 5567 SPIE, pp. 107-118.
Wang, J. et al., Standard Cell Layout with Regular Contact Placement, IEEE Trans. on Semicon. Mfg., vol. 17, No. 3, Aug. 2004, pp. 375-383.
Webb, Clair, "Layout Rule Trends and Affect upon CPU Design", 2006, vol. 6156 SPIE, 9 pages.
Webb, Clair, "45nm Design for Manufacturing," Intel Technology Journal, vol. 12, Issue 02, Jun. 17, 2008, ISSN 1535-864X, pp. 121-130.
Wenren, et al., "The Improvement of Photolithographic Fidelity of Two-dimensional Structures Though Double Exposure Method", 2007, SPIE Proceeding Series, vol. 6520; 65202I, 12 pages.
Wilcox, et al., "Design for Manufacturability: A Key to Semiconductor Manufacturing Excellence", 1998, IEEE, pp. 308-313.
Wu, et al., "A Study of Process Window Capabilities for Two-dimensional Structures under Double Exposure Condition", 2007, SPIE Proceeding Series, vol. 6520; 65202O, 10 pages.
Xiong, et al., "The Constrained Via Minimization Problem for PCB and VLSI Design", 1988, ACM Press/IEEE, pp. 573-578.
Yamamoto, et al., "New Double Exposure Technique without Alternating Phase Shift Mask", 2007, SPIE Proceeding Series, vol. 6520; 652052P, 11 pages.
Yang, et al., "Interconnection Driven VLSI Module Placement Based on Quadratic Programming and Considering Congestion Using LFF Principles", 2004, IEEE, pp. 1243-1247.
Yao, et al., "Multilevel Routing With Redundant Via Insertion", Oct. 2006, IEEE, pp. 1148-1152.
Zheng, et al."Modeling and Analysis of Regular Symmetrically Structured Power/Ground Distribution Networks", DAC, Jun. 10-14, 2002, ACM Press, pp. 395-398.
Zhu, et al., "A Stochastic Integral Equation Method for Modeling the Rough Surface Effect on Interconnect Capacitance", 2004, IEEE, pp. 887-891.
Zhu, et al., "A Study of Double Exposure Process Design with Balanced Performance Parameters for Line/Space Applications", 2007, SPIE Proceeding Series, vol. 6520; 65202H, 11 pages.
Zuchowski, et al., "A Hybrid ASIC and FPGA Architecture", 2003, IEEE, pp. 187-194.
Capodieci, L., et al., "Toward a Methodology for Manufacturability-Driven Design Rule Exploration," DAC 2004, Jun. 7-11, 2004, San Diego, CA.
Dictionary.com, "channel," in Collins English Dictionary—Complete & Unabridged 10th Edition. Source location: HarperCollins Publishers. http://dictionary.reference.com/browse/channel. Available: http://dictionary.reference.com.
Gupta et al. "Manufacturing-Aware Physical Design", 2003, ACM.
Gupta, Puneet, et al., "Manufacturing-aware Design Methodology for Assist Feature Correctness," 2005.
Halpin et al., "Detailed Placement with Net Length Constraints," Publication Year 2003, Proceedings of the 3rd IEEE International Workshop on System-on-Chip for Real-Time Applications, pp. 22-27.
Hur et al., "Mongrel: Hybrid Techniques for Standard Cell Placement," Publication Year 2000, IEEE/ACM International Conference on Computer Aided Design, ICCAD-2000, pp. 165-170.
Kuh et al., "Recent Advances in VLSI Layout," Publication Year 1990, Proceedings of the IEEE, vol. 78, Issue 2, pp. 237-263.
Liebmann et al., "Optimizing Style Options for Sub-Resolution Assist Features," Proc. of SPIE, vol. 4346, 2001, pp. 141-152.
Mansfield et al., "Lithographic Comparison of Assist Feature Design Strategies," Proc. of SPIE, vol. 4000, 2000, pp. 63-76.
Mishra, P., et al., "FinFET Circuit Design," Nanoelectronic Circuit Design, pp. 23-54, 2011.
Pham, D., et al., "FINFET Device Junction Formation Challenges," 2006 International Workshop on Junction Technology, pp. 73-77, Aug. 2006.
Smayling et al., "APF Pitch Halving for 22 nm Logic Cells Using Gridded Design Rules," Proceedings of SPIE, USA, vol. 6925, Jan. 1, 2008, pp. 69251E-1-69251E-7.
Firedberg, et al., "Modeling Within-Field Gate Length Spatial Variation for Process-Design Co-Optimization, " 2005 Proc. of SPIE vol. 5756, pp. 178-188.
Hakko, et al., "Extension of the 2D-TCC Technique to Optimize Mask Pattern Layouts," 2008 Proc. of SPIE, vol. 7028, 11 pages.

Kawashima, et al., "Mask Optimization for Arbitrary Patterns with 2D-TCC Resolution Enhancement Technique," 2008 Proc. of SPIE vol. 6924, 12 pages.

Rosenbluth, et al., "Optimum Mask and Source Patterns to Print a Given Shape," 2001 Proc. of SPIE vol. 4346, pp. 486-502.

Socha, et al., "Simultaneous Source Mask Optimization (SMO)," 2005 Proc. of SPIE vol. 5853, pp. 180-193.

Wong, et al., "Resolution Enhancement Techniques and Design for Manufacturability: Containing and Accounting for Variabilities in Integrated Circuit Creation," J. Micro/Nanolith. MEMS MOEMS, Jul.-Sep. 2007, vol. 6(3), 2 pages.

Yamazoe, et al., "Resolution Enhancement by Aerial Image Approximation with 2D-TCC," 2007 Proc. of SPIE vol. 6730, 12 pages.

Yu, et al., "True Process Variation Aware Optical Proximity Correction with Variational Lithography Modeling and Model Calibration," J. Micro/Nanolith. MEMS MOEMS, Jul.-Sep. 2007, vol. 6(3), 16 pages.

* cited by examiner

METHODS FOR DEFINING AND UTILIZING SUB-RESOLUTION FEATURES IN LINEAR TOPOLOGY

CLAIM OF PRIORITY

This application claims priority under 35 U.S.C. 119(e) to U.S. Provisional Patent Application No. 61/059,712, filed Jun. 6, 2008, entitled "Methods for Defining and Utilizing Sub-Resolution Features in Linear Topology."

This application is a continuation-in-part application under 35 U.S.C. 120 of prior U.S. application Ser. No. 12/013,342, filed Jan. 11, 2008 now U.S. Pat. No. 7,917,879, entitled "Semiconductor Device with Dynamic Array Section," which claims priority under 35 U.S.C. 119(e) to both U.S. Provisional Patent Application No. 60/963,364, filed Aug. 2, 2007, and to prior U.S. Provisional Patent Application No. 60/972,394, filed Sep. 14, 2007.

This application is also a continuation-in-part application under 35 U.S.C. 120 of prior U.S. application Ser. No. 12/212,562, filed Sep. 17, 2008 now U.S. Pat. No. 7,842,975, entitled "Dynamic Array Architecture," which is a continuation application under 35 U.S.C. 120 of prior U.S. application Ser. No. 11/683,402, filed Mar. 7, 2007 now U.S. Pat. No. 7,446,352, which claims priority under 35 U.S.C. 119(e) to U.S. Provisional Patent Application No. 60/781,288, filed Mar. 9, 2006.

The disclosure of each above-identified patent application is incorporated herein by reference in its entirety.

BACKGROUND

A push for higher performance and smaller die size drives the semiconductor industry to reduce circuit chip area by approximately 50% every two years. The chip area reduction provides an economic benefit for migrating to newer technologies. The 50% chip area reduction is achieved by reducing the feature sizes between 25% and 30%. The reduction in feature size is enabled by improvements in manufacturing equipment and materials. For example, improvement in the lithographic process has enabled smaller feature sizes to be achieved, while improvement in chemical mechanical polishing (CMP) has in-part enabled a higher number of interconnect layers.

In the evolution of lithography, as the minimum feature size approached the wavelength of the light source used to expose the feature shapes, unintended interactions occurred between neighboring features. Today minimum feature sizes are being reduced below 45 nm (nanometers), while the wavelength of the light source used in the photolithography process remains at 193 nm. The difference between the minimum feature size and the wavelength of light used in the photolithography process is defined as the lithographic gap. As the lithographic gap grows, the resolution capability of the lithographic process decreases.

An interference pattern occurs as each shape on the mask interacts with the light. The interference patterns from neighboring shapes can create constructive or destructive interference. In the case of constructive interference, unwanted shapes may be inadvertently created. In the case of destructive interference, desired shapes may be inadvertently removed. In either case, a particular shape is printed in a different manner than intended, possibly causing a device failure. Correction methodologies, such as optical proximity correction (OPC), attempt to predict the impact from neighboring shapes and modify the mask such that the printed shape is fabricated as desired. However, the quality of the light interaction prediction is declining as process geometries shrink and as the light interactions become more complex.

In view of the foregoing, solutions are sought for improvements in circuit design and layout that can improve management of lithograpbic gap issues as technology continues to progress toward smaller semiconductor device features sizes.

SUMMARY

In one embodiment, a method is disclosed for using sub-resolution shapes placed on a virtual grate to reinforce regular layout shapes in a lithographic process. The method includes determining whether an unoccupied layout space adjacent to a regular layout shape to be reinforced, and extending in a direction perpendicular to the regular layout shape to be reinforced, is large enough to support placement of a sub-resolution shape. The regular layout shape to be reinforced is placed in accordance with a virtual grate. Upon determining that the unoccupied layout space is large enough to support placement of the sub-resolution shape, the method includes placing the sub-resolution shape so as to be substantially centered upon a virtual line of the virtual grate within the unoccupied layout space.

In one embodiment, a computer readable storage medium having programming instructions stored thereon for generating a semiconductor chip layout recorded in a digital format is disclosed. The computer readable medium includes program instructions for determining whether an unoccupied layout space adjacent to a regular layout shape to be reinforced, and extending in a direction perpendicular to the regular layout shape to be reinforced, is large enough to support placement of a sub-resolution shape. The regular layout shape to be reinforced is placed in accordance with a virtual grate. The computer readable medium also includes program instructions for placing the sub-resolution shape so as to be substantially centered upon a virtual line of the virtual grate within the unoccupied layout space, upon determining that the unoccupied layout space is large enough to support placement of the sub-resolution shape.

In one embodiment, a method is disclosed for placing sub-resolution shapes within a layout based on regular layout shape edges. In the method, a first edge of a first regular layout shape to be reinforced is selected. A determination is made that a second regular layout shape is placed parallel to and facing the first edge of the first regular layout shape. A second edge of the second regular layout shape to be reinforced is selected. The second edge faces the first edge. The method also includes determination of a first window of lithographic reinforcement for the first edge, and determination of a second window of lithographic reinforcement for the second edge. The method further includes determining that the first and second windows of lithographic reinforcement support placement of at least one sub-resolution shape within an unoccupied layout space between the first and second edges. Then, one or more sub-resolution shapes are placed within the unoccupied layout space such that each of the one or more sub-resolution shapes is placed within at least one of the first and second windows of lithographic reinforcement, and such that the one or more sub-resolution shapes are placed so as to extend parallel to the first and second edges.

In one embodiment, a computer readable storage medium having programming instructions stored thereon for generating a semiconductor chip layout recorded in a digital format is disclosed. The computer readable medium includes program instructions for selecting a first edge of a first regular layout shape to be reinforced. Program instructions are included for determining that a second regular layout shape is placed parallel to and facing the first edge of the first regular layout shape. Program instructions are included for selecting a second edge of the second regular layout shape to be reinforced. The second edge faces the first edge. Program instructions are included for determining a first window of lithographic reinforcement for the first edge, and for determining a second window of lithographic reinforcement for the second edge. Program instructions are included for determining that the first and second windows of lithographic reinforcement support placement of at least one sub-resolution shape within an unoccupied layout space between the first and second edges. Program instructions are included for placing one or more sub-resolution shapes within the unoccupied layout space, such that each of the one or more sub-resolution shapes is placed within at least one of the first and second windows of lithographic reinforcement, and such that the one or more sub-resolution shapes are placed so as to extend parallel to the first and second edges.

Other aspects and advantages of the invention will become more apparent from the following detailed description, taken in conjunction with the accompanying drawings, illustrating by way of example the present invention.

DETAILED DESCRIPTION

Figure 1:
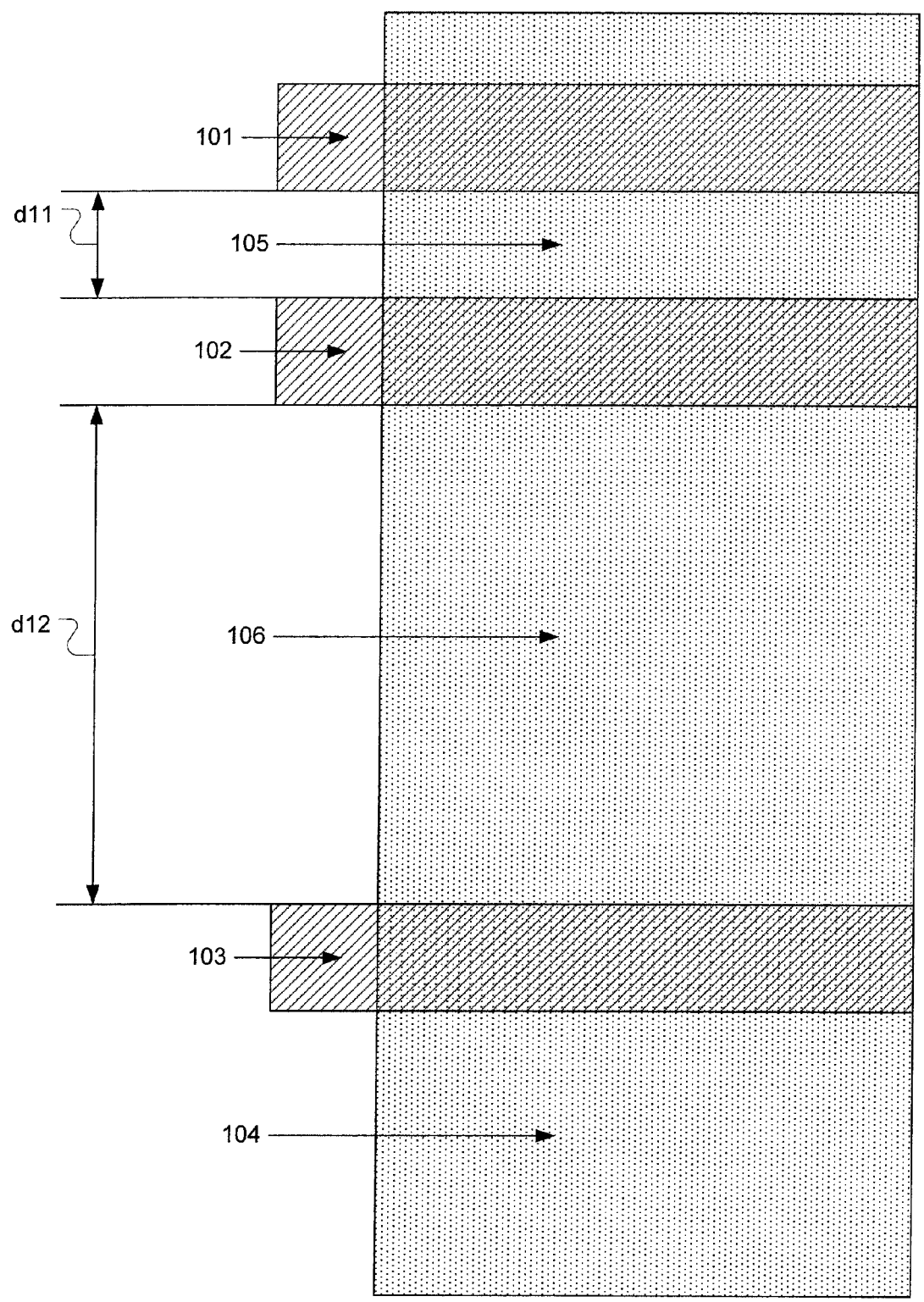
FIG. 1 shows an exemplary gate electrode configuration, in accordance with one embodiment of the present invention.

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Dynamic Array Architecture

The dynamic array architecture represents a semiconductor device design paradigm in which linear-shaped layout features are defined along a regular-spaced virtual grate (or regular-spaced virtual grid) in a number of levels of a cell, i.e., in a number of levels of a semiconductor chip. The virtual grate is defined by a set of equally spaced, parallel virtual lines extending across a given level in a given chip area. The virtual grid is defined by a first set of equally spaced, parallel virtual lines extending across a given level in a given chip area in a first direction, and by a second set of equally spaced, parallel virtual lines extending across the given level in the given chip area in a second direction, where the second direction is perpendicular to the first direction. In one embodiment, the virtual grate of a given level is oriented to be substantially perpendicular to the virtual grate of an adjacent level. However, in other embodiments, the virtual grate of a given level is oriented to be either perpendicular or parallel to the virtual grate of an adjacent level.

In one embodiment, each linear-shaped layout feature of a given level is substantially centered upon one of the virtual lines of the virtual grate associated with the given level. A linear-shaped layout feature is considered to be substantially centered upon a particular line of a virtual grate when a deviation in alignment between of the centerline of the linear-shaped layout feature and the particular line of the virtual grate is sufficiently small so as to not reduce a manufacturing process window from what would be achievable with a true alignment between of the centerline of the linear-shaped layout feature and the line of the virtual grate.

In one embodiment, the above-mentioned manufacturing process window is defined by a lithographic domain of focus and exposure that yields an acceptable fidelity of the layout feature. In one embodiment, the fidelity of a layout feature is defined by a characteristic dimension of the layout feature. Also, it should be understood that the centerline of a given linear-shaped layout feature is defined as a virtual line that passes through the cross-sectional centroid of the linear-shaped layout feature at all points along its length, wherein the cross-sectional centroid of the linear-shaped layout feature at any given point along its length is the centroid of its vertical cross-section area at the given point.

In another embodiment, some linear-shaped layout features in a given level may not be centered upon a virtual line of the virtual grate associated with the given level. However, in this embodiment, the linear-shaped layout features remain parallel to the virtual lines of the virtual grate, and hence parallel to the other linear-shaped layout features in the given level. Therefore, it should be understood that the various linear-shaped layout features defined in a layout of a given level are oriented to extend across the given level in a parallel manner.

Also, in the dynamic array architecture, each linear-shaped layout feature is defined to be devoid of a substantial change in direction along its length. The lack of substantial change in direction of a linear-shaped layout feature is considered relative to the line of the virtual grate along which the linear-shaped layout feature is defined. In one embodiment, a substantial change in direction of a linear-shaped layout feature exists when the width of the linear-shaped layout feature at any point thereon changes by more than 50% of the nominal width of the linear-shaped layout feature along its entire length. In another embodiment, a substantial change in direction of a linear-shaped layout feature exists when the width of the linear-shaped layout feature changes from any first location on the linear-shaped layout feature to any second location on the linear-shaped layout feature by more that 50% of the linear-shaped layout feature width at the first location. Therefore, it should be appreciated that the dynamic array architecture specifically avoids the use of non-linear-shaped layout features, wherein a non-linear-shaped layout feature includes one or more bends within a plane of the associated level.

In the dynamic array architecture, variations in a vertical cross-section shape of an as-fabricated linear-shaped layout feature can be tolerated to an extent, so long as the variation in the vertical cross-section shape is predictable from a manufacturing perspective and does not adversely impact the manufacture of the given linear-shaped layout feature or its neighboring layout features. In this regard, the vertical cross-section shape corresponds to a cut of the as-fabricated linear-shaped layout feature in a plane perpendicular to the centerline of the linear-shaped layout feature. It should be appreciated that variation in the vertical cross-section of an as-fabricated linear-shaped layout feature along its length can correspond to a variation in width along its length. Therefore, the dynamic array architecture also accommodates variation in the width of an as-fabricated linear-shaped layout feature along its length, so long as the width variation is predictable from a manufacturing perspective and does not adversely impact the manufacture of the linear-shaped layout feature or its neighboring layout features.

Additionally, different linear-shaped layout features within a given level can be designed to have the same width or different widths. Also, the widths of a number of linear-shaped layout features defined along adjacent lines of a given virtual grate can be designed such that the number of linear-shaped layout features contact each other so as to form a single linear-shaped layout feature having a width equal to the sum of the widths of the number of linear-shaped layout features.

Within a given level defined according to the dynamic array architecture, proximate ends of adjacent, co-aligned linear-shaped layout features may be separated from each other by a substantially uniform gap. More specifically, adjacent ends of linear-shaped layout features defined along a common line of a virtual grate are separated by an end gap, and such end gaps within the level associated with the virtual grate may be defined to span a substantially uniform distance. Additionally, in one embodiment, a size of the end gaps is minimized within a manufacturing process capability so as to optimize filling of a given level with linear-shaped layout features.

Also, in the dynamic array architecture, a level can be defined to have any number of virtual grate lines occupied by any number of linear-shaped layout features. In one example, a given level can be defined such that all lines of its virtual grate are occupied by at least one linear-shaped layout feature. In another example, a given level can be defined such that some lines of its virtual grate are occupied by at least one linear-shaped layout feature, and other lines of its virtual grate are vacant, i.e., not occupied by any linear-shaped layout features. Furthermore, in a given level, any number of successively adjacent virtual grate lines can be left vacant. Also, the occupancy versus vacancy of virtual grate lines by linear-shaped layout features in a given level may be defined according to a pattern or repeating pattern across the given level.

Additionally, within the dynamic array architecture, vias and contacts are defined to interconnect a number of the linear-shaped layout features in various levels so as to form a number of functional electronic devices, e.g., transistors, and electronic circuits. Layout features for the vias and contacts can be aligned to virtual grid, wherein a specification of this virtual grid is a function of the specifications of the virtual grates associated with the various levels to which the vias and contacts will connect. Thus, a number of the linear-shaped layout features in various levels form functional components of an electronic circuit. Additionally, some of the linear-shaped layout features within various levels may be non-functional with respect to an electronic circuit, but are manufactured nonetheless so as to reinforce manufacturing of neighboring linear-shaped layout features. It should be understood that the dynamic array architecture is defined to enable accurate prediction of semiconductor device manufacturability with a high probability.

In view of the foregoing, it should be understood that the dynamic array architecture is defined by placement of linear-shaped layout features on a regular-spaced grate (or regular-spaced grid) in a number of levels of a cell, such that the linear-shaped layout features in a given level of the cell are oriented to be substantially parallel with each other in their traversal direction across the cell. Also, in the dynamic array architecture, prior to PCT processing, each linear-shaped layout feature is defined to be devoid of a substantial change in direction relative to its traversal direction across the cell.

Cell

A cell, as referenced herein, represents an abstraction of a logic function, and encapsulates lower-level integrated circuit layouts for implementing the logic function. It should be understood that a given logic function can be represented by multiple cell variations, wherein the cell variations may be differentiated by feature size, performance, and process compensation technique (PCT) processing. For example, multiple cell variations for a given logic function may be differentiated by power consumption, signal timing, current leakage, chip area, OPC, RET, etc. Additionally, multiple cell variations may be differentiated by sub-layout sequence combination. It should also be understood that each cell description includes the layouts for the cell in each level of a chip, as required to implement the logic function of the cell. More specifically, a cell description includes layouts for the cell in each level of the chip extending from the substrate level up through a particular interconnect level.

Exemplary Embodiments

An exemplary gate electrode configuration is shown in FIG. 1, in accordance with one embodiment of the present invention. In this example, gate electrodes 101, 102, and 103 overlap diffusion shape 104 to form transistors. Node 105 is the shared source node of the transistors formed by gate electrodes 101 and 102. Node 106 is the shared drain of transistors formed by gate electrodes 102 and 103.

Also shown in FIG. 1, gate electrodes 101 and 102 are a distance d11 apart, and gate electrodes 102 and 103 are a distance d12 apart. The distances d11 and d12 are sub-optimal for the lithographic process and may produce transistor devices with a high variability in gate dimension. It should be understood that sub-optimally placed devices can cause a high variability in semiconductor manufacturing process results, thereby causing discrepancies between as-fabricated devices and simulations thereof.

A sub-resolution shape is defined as a mask feature in a given chip level that will not lithographically resolve during manufacturing. One method to form a sub-resolution shape is to restrict a width of the sub-resolution shape along one dimension to a value that is sufficiently small to ensure that the shape will not lithographically resolve. For example, in one embodiment, a sub-resolution shape is defined in a linear manner such that its cross-section when viewed from the top is substantially rectangular so as to have a length and a width, wherein the width is sufficiently small to ensure that the sub-resolution shape does not resolve. Note that in the following text a "regular layout shape" refers to a layout shape that is not a sub-resolution shape. It should also be understood that the terms "shape" and "feature" are synonymous and can be used interchangeably.

A virtual grate (VG) is defined by a set of virtual lines extending in a parallel manner across a portion of a chip level, wherein adjacent ones of the virtual lines are spaced at a substantially constant pitch. One method for determining a VG includes an operation for identifying design rules that pertain to placement of regular layout shapes, i.e., layout polygons, for a chip level, or portion thereof. The method includes another operation for examining applicable design rules to define the VG such that regular layout shapes can be placed according to the VG and can be placed in optimal proximity to each other, with consideration for placement of regular layout shapes (on multiple levels) that require interconnection to perform a desired function. In one embodiment, a VG is defined globally and is applied to a chip area of arbitrary size, shape, and position. Additionally, regular layout shapes within a given chip area may also be placed according to a combination of virtual grates (VGs).

Figure 2:
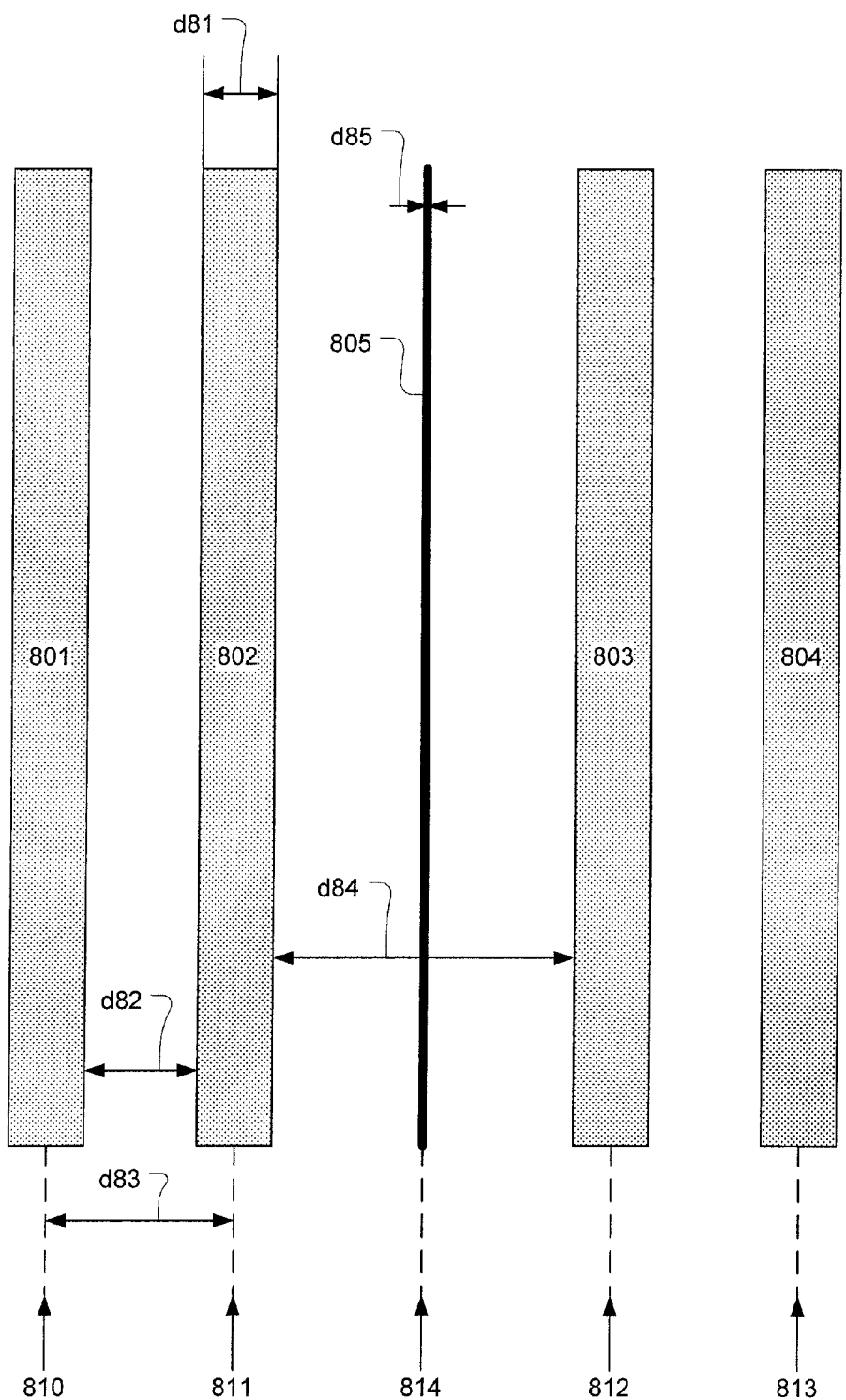
FIG. 2 shows one example for derivation and use of a locally defined virtual grate, in accordance with one embodiment of the present invention.

FIG. 2 shows one example for derivation and use of a locally defined VG, in accordance with one embodiment of the present invention. The VG in this example is defined by virtual lines 810-814, which are oriented to be parallel to each other and are spaced apart by distance d83, i.e., pitch d83. Dimension d81 defines a regular layout shape width for the portion of the chip level of interest, and dimension d82 defines a first spacing between regular layout shapes for the portion of the chip level of interest, and dimension d84 defines a second spacing between regular layout shapes for the portion of the chip level of interest. Regular layout shapes 801-804 are placed on virtual lines 810-813, respectively, of the VG The different feature spacings d83 and d84 may be sub-optimal for the lithographic process. To address this issue, sub-resolution shape 805 can be placed on virtual line 814 of the VG. It should be appreciated that the width d85 of the sub-resolution shape 805 is sufficiently small that sub-resolution shape 805 will not lithographically resolve.

Figure 3:
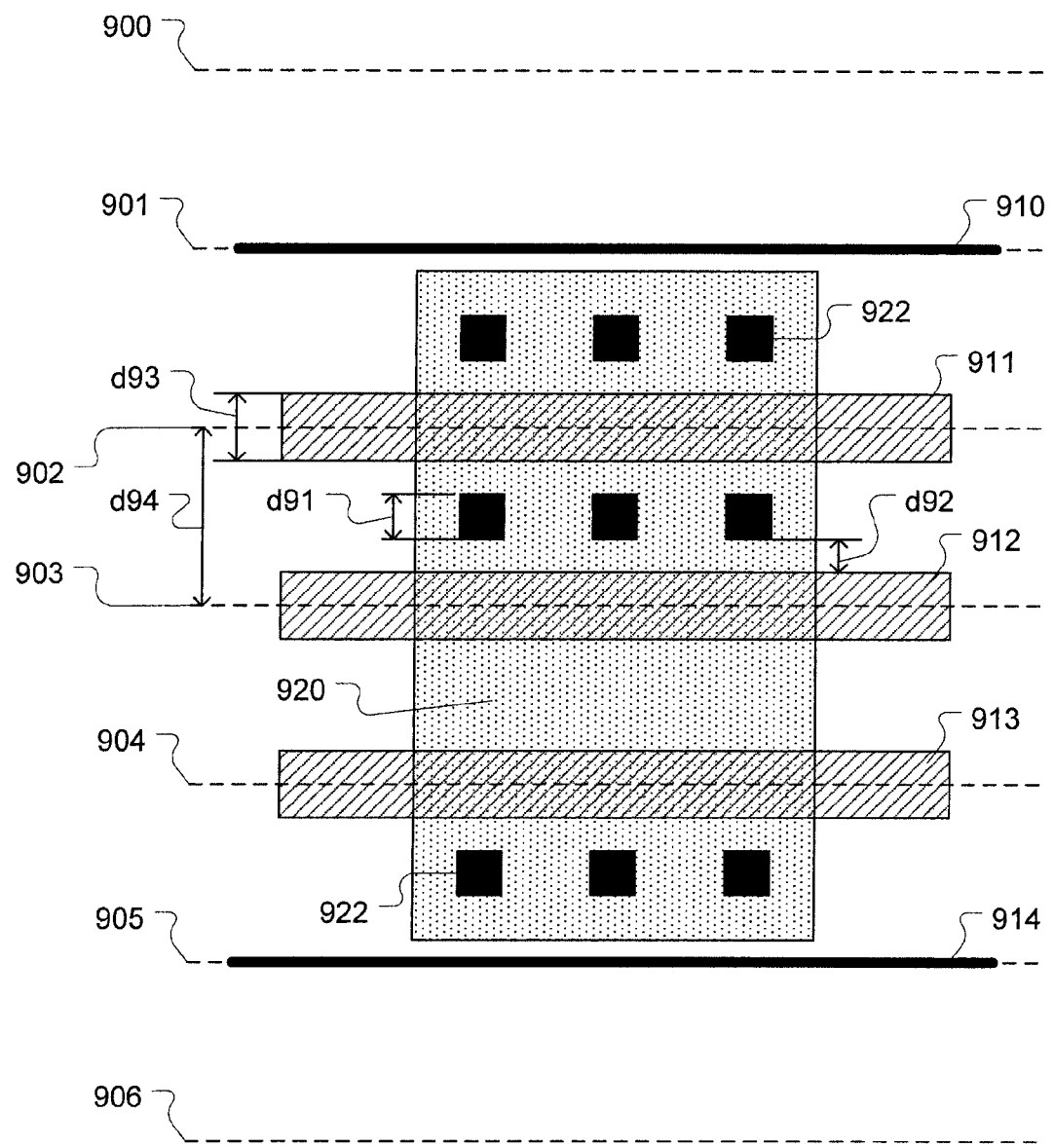
FIG. 3 shows one example for derivation and use of a virtual grate for a gate electrode level, in accordance with one embodiment of the present invention.

FIG. 3 shows one example for derivation and use of a VG for a gate electrode level, wherein the VG is defined by virtual lines 900-906, in accordance with one embodiment of the present invention. A diffusion region 920 and a number of contacts 922 are defined within the portion of the chip. To avoid unnecessarily obscuring FIG. 3, some of the number of contacts 922 are not labeled with reference number 922, but it should be understood that each black square represents one of the number of contacts 922. A number of linear-shaped gate electrode features 911-913 are placed on virtual lines 902-904, respectively. Dimension d91 defines a width of each contact 922. Dimension d92 defines a contact-to-gate electrode space. Dimension d93 defines a width of each gate electrode feature 911-913. Sub-resolution shapes 910 and 914 are defined to enhance the lithographic resolution of gate electrode features 911 and 913, respectively. In this example, the sub-resolution shapes 910 and 914 are placed on virtual lines 901 and 905, respectively, of the same VG upon which the gate electrode features 911-913 are placed. It should be noted that the VG in this example is derived from the dimensions d91, d92 and d93, such that the pitch d94 of the VG is equal to (d91+(2*d92)+d93).

Figure 4:
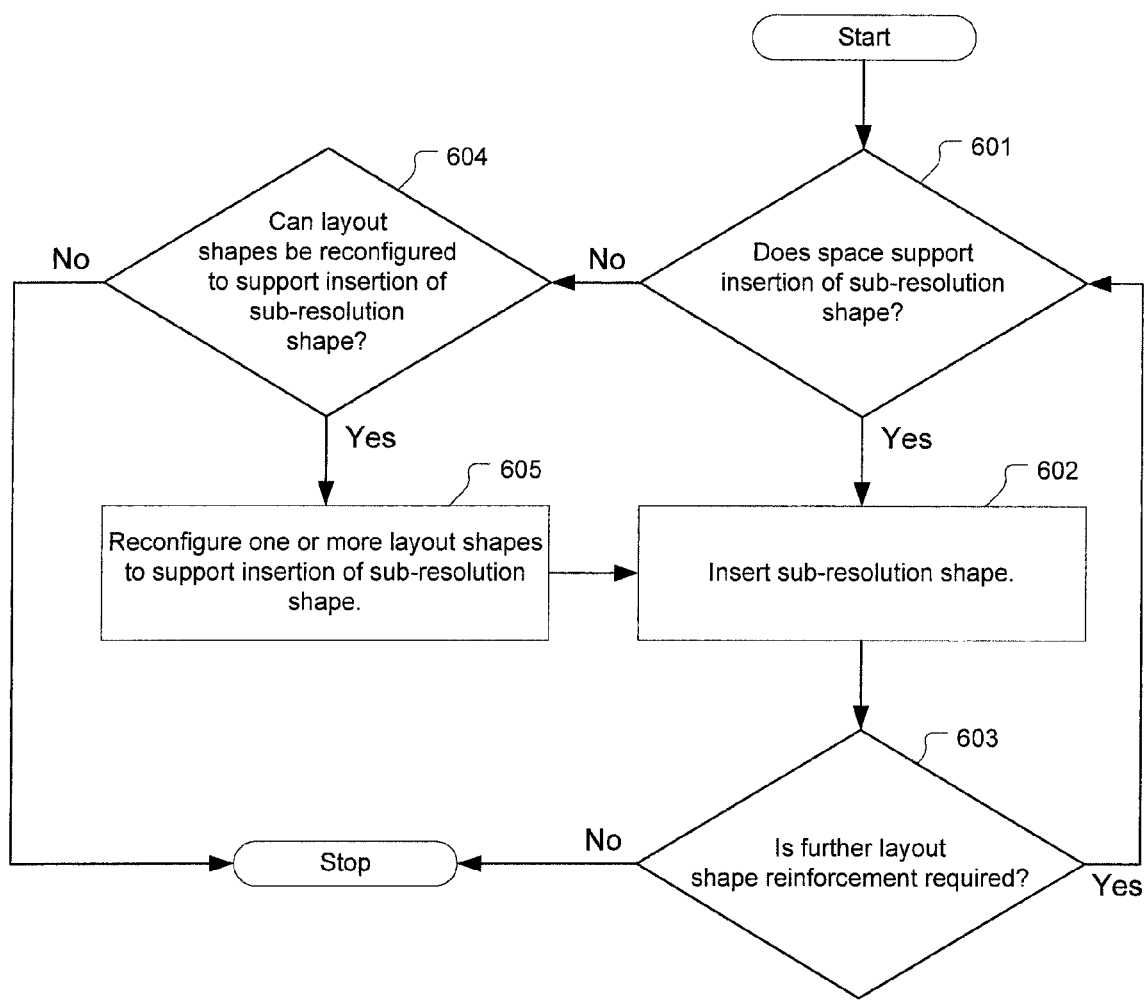
FIG. 4 shows a flowchart of a method for using sub-resolution shapes placed on a virtual grate to reinforce regular layout shapes in a lithographic process, in accordance with one embodiment of the present invention.

FIG. 4 shows a flowchart of a method for using sub-resolution shapes placed on a VG to reinforce regular layout shapes in a lithographic process, referred to as the VG-based method, where there are multiple regular layout shapes separated by gaps, in accordance with one embodiment of the present invention. The method includes an operation 601 for determining whether a space adjacent to a regular layout shape to be reinforced, and extending in a direction perpendicular to the regular layout shape to be reinforced, is large enough to support a sub-resolution shape. This determination considers a minimum required space between an edge of the sub-resolution shape in a proposed placement and a nearest edge of the regular layout shape to be reinforced. This minimum required space may be derived from manufacturing rules, lithographic constraints, or other limitations. The determination of operation 601 also considers a distance requirement between an edge of the sub-resolution shape in it's proposed location and a nearest edge of any neighboring regular layout shape of the same level that has already been placed, wherein this considered distance extends in a direction that is perpendicular to the edge of the sub-resolution shape.

If operation 601 determines that the space adjacent to the regular layout shape to be reinforced is not large enough to support a sub-resolution feature, the method continues to an operation 604, where an evaluation is made as to whether regular layout shapes in the vicinity may be reconfigured to enable the insertion of a sub-resolution shape. Such reconfiguration may include, but is not limited to, techniques of: changing placement of the regular layout shape under consideration for reinforcement, changing placement of neighboring regular layout shapes and/or neighboring sub-resolution shapes, modification of a given regular layout shape's width dimension to change an edge location of the given regular layout shape to a more favorable one, and/or other layout modification. If the evaluation of reconfigurability in operation 604 is negative, i.e., reconfiguration is not possible, the method terminates. If the evaluation of reconfigurability in operation 604 is positive, i.e., reconfiguration is possible, the method continues to an operation 605.

In operation 605, one or more regular layout shapes and/or sub-resolution shapes in the vicinity of the regular layout shape to be reinforced is reconfigured to enable the insertion of a sub-resolution shape. From the operation 605, the method then proceeds to an operation 602 where a sub-resolution shape is placed so as to reinforce the regular layout shape under consideration. Also, if operation 601 determines that the space adjacent to the regular layout shape to be reinforced is large enough to support insertion of a sub-resolution feature, the method proceeds from operation 601 to operation 602. In one embodiment, the sub-resolution shape is placed in operation 602 so as to be centered upon a virtual line of a VG that is associated with placement of the regular layout shape under consideration.

From operation 602, the method proceeds with an operation 603 for determining whether there is benefit in adding more sub-resolution shapes within the space adjacent to the regular layout shape under consideration. A diminished benefit in adding more sub-resolution shapes may exist when sufficient sub-resolution shapes have already been placed near the regular layout shape under consideration, and when there are no other regular layout shapes in the vicinity that require lithographic reinforcement. If there is insufficient benefit in adding further sub-resolution shapes within the space adjacent to the regular layout shape under consideration, the method terminates. However, if there is a benefit, the method reverts back to operation 601. The method of FIG. 4 may be respectively performed on any number of regular layout features within a given layout.

Figure 5:
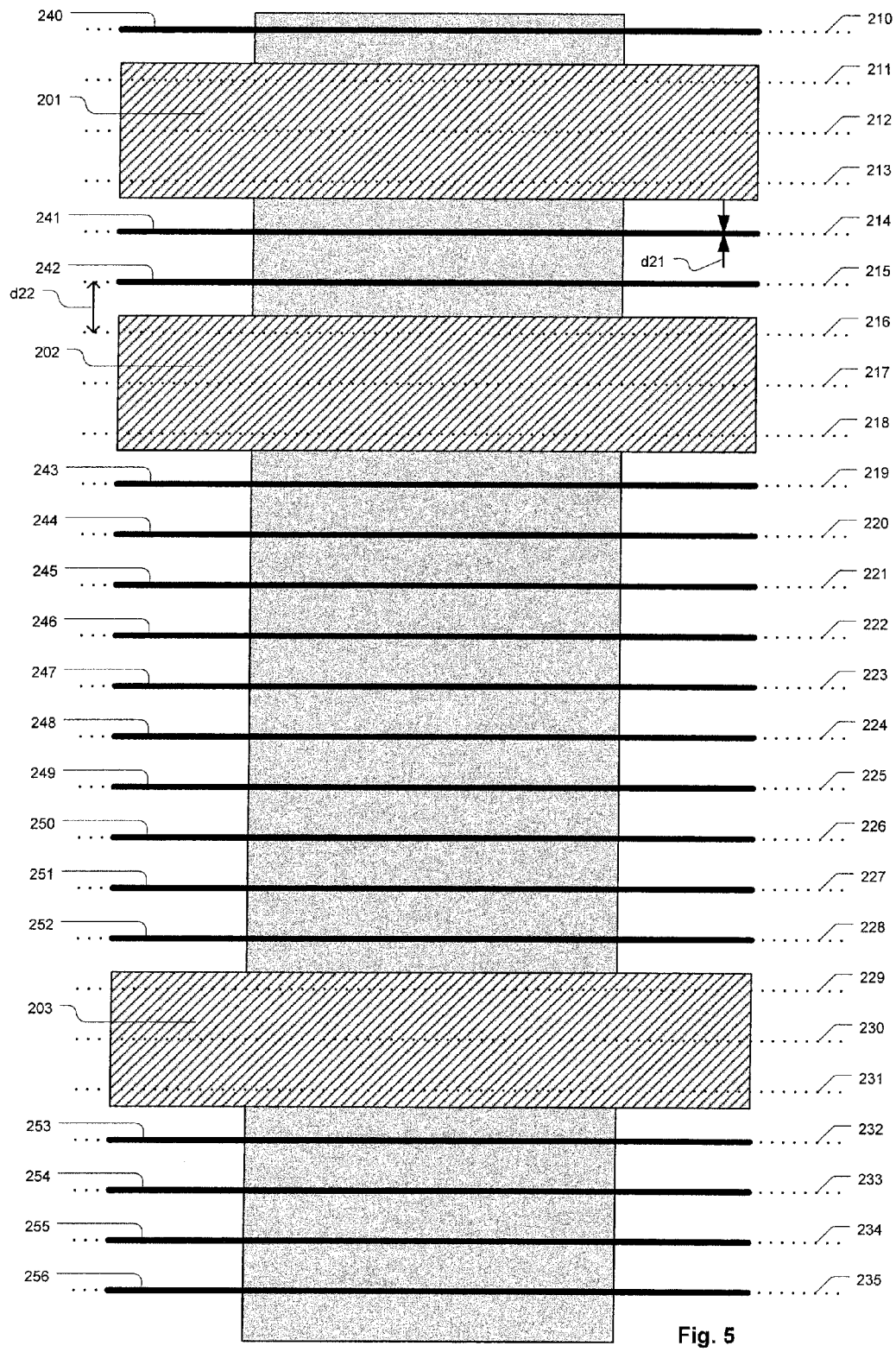
FIG. 5 shows an example of sub-resolution shape placement, in accordance with one embodiment of the present invention.

FIG. 5 shows an example of sub-resolution shape placement, in accordance with one embodiment of the present invention. In the embodiment of FIG. 5, sub-resolution shapes are placed according to the VG used to place the regular layout shapes. More specifically, sub-resolution shapes are placed on unoccupied virtual lines of the VG, where each unoccupied virtual line does not have a regular layout feature defined thereover. The virtual grate for the regular layout shapes is defined by virtual lines 210-235 at a pitch d22. Regular layout features 201-203 are placed on, i.e., centered on, virtual grate lines 212, 217, and 230, respectively. Sub-resolution shapes 240-256 are placed on respective virtual grate lines that are not occupied by the regular layout features 201-203. The sub-resolution shapes 240-256 are defined to lithographically reinforce the regular layout shapes 201-203. Also, each sub-resolution shape 240-256 is defined to have a width d21 that is sufficiently small so as to prevent the sub-resolution shape from resolving during the lithography process.

In some embodiments, a VG used to place regular layout features in a given chip level may not define allowable placement locations for sub-resolution shapes, or a portion thereof, in the given level. For example, when multiple VGs are used to place regular layout shapes in respective areas of a given chip level, an interface may exist between two or more of the multiple VGs.

Because the multiple VGs of the given level can be defined independently from each other, it is possible that the VGs will not co-align at the VG interface. Therefore, it is necessary to evaluate a solution for placing one or more regular layout shapes and/or one or more sub-resolution shapes at the VG interface. In this regard, at least two situations may occur. A first situation (Situation 1) is defined by placement of a regular layout feature over the VG interface. A second situation (Situation 2) is defined by placement of one or more sub-resolution shapes at or near the VG interface, without placement of a regular layout shape over the VG interface.

Figure 6:
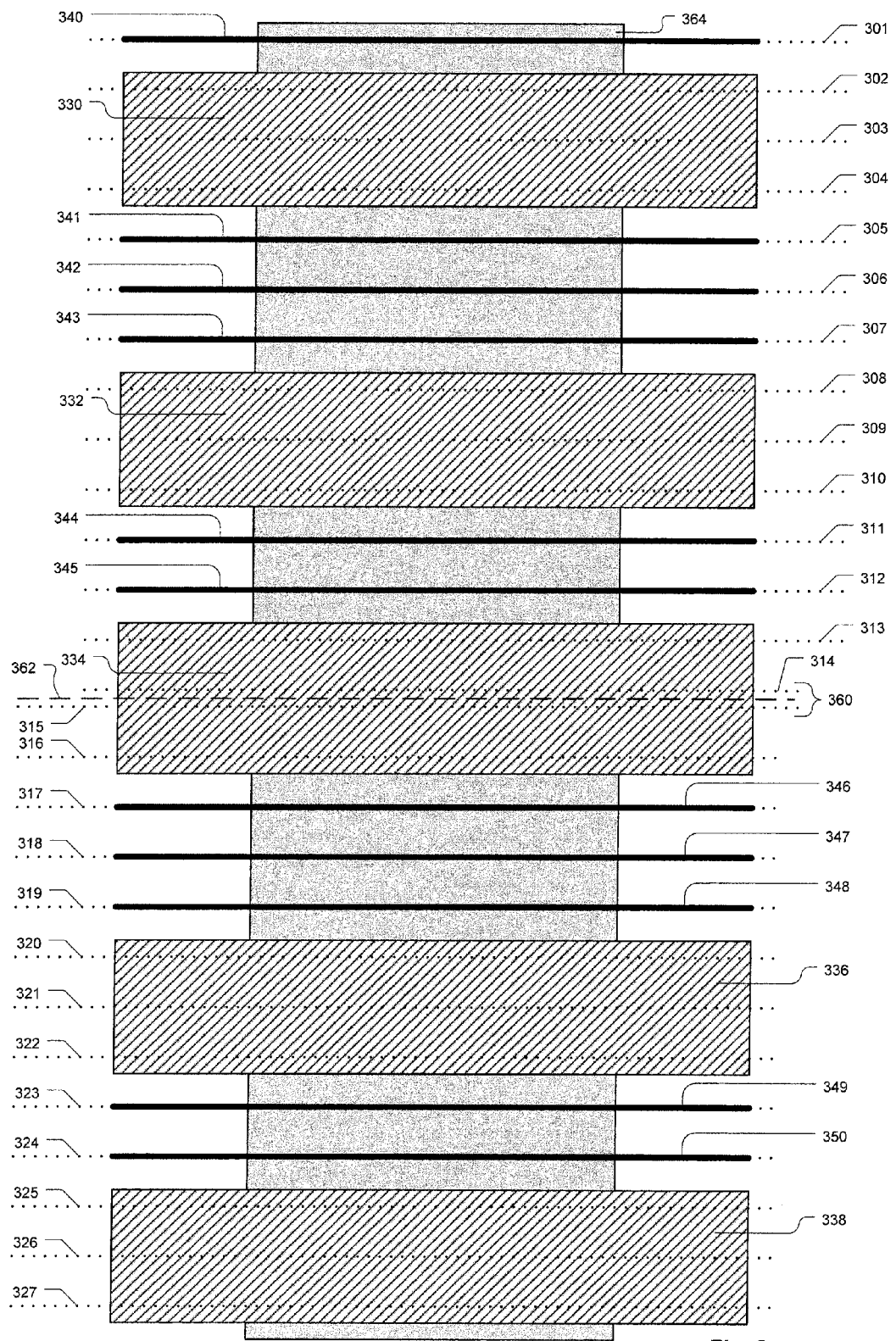
FIG. 6 illustrates a situation in which a regular layout shape is placed over a virtual grate interface, in accordance with one embodiment of the present invention.

FIG. 6 illustrates situation 1, in which a regular layout shape 334 is placed over the VG interface 360, in accordance with one embodiment of the present invention. In the example layout of FIG. 6, regular layout shapes 330, 332, 334, 336, and 338 are defined to extend over a diffusion region 364 and are placed according to one of a number of VGs. In situation 1, the regular layout feature 334 that extends over the VG interface 360 is centered upon a "mean virtual line" 362. The mean virtual line 362 is centered between a given virtual line 314 of a first interfacing VG (301-314) and a virtual line 315 of a second interfacing VG (315-327) that is adjacent to the given virtual line 314 of the first interfacing VG (301-314). Thus, the mean virtual line 362 is defined to bisect a space between two adjacent virtual lines (314 and 315) of the first and second interfacing VGs, respectively. Also in situation 1, the sub-resolution features (340-350) within each chip area associated with a given VG are aligned to the given VG. Specifically, sub-resolution features 340-345 are aligned to the VG defined by virtual lines 301-314. Also, sub-resolution features 346-350 are aligned to the VG defined by virtual lines 315-327.

Figure 7:
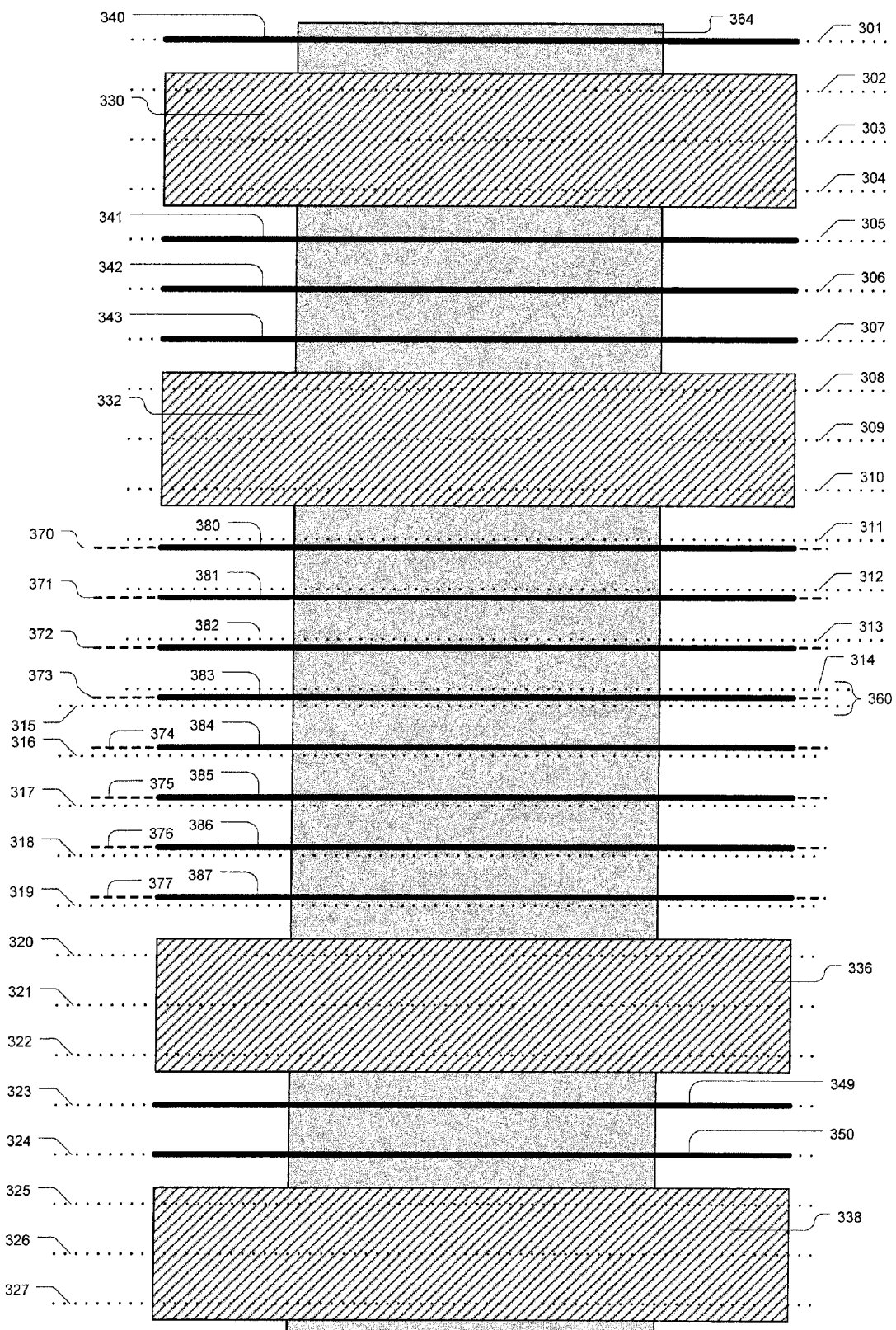
FIG. 7 illustrates a situation in which sub-resolution features within a given chip area are aligned to a virtual grate associated with the given chip area, except for those sub-resolution features that are placed between an outermost regular layout feature of the chip area and an adjacent virtual grate interface, in accordance with one embodiment of the present invention.

FIG. 7 illustrates situation 2, in which the sub-resolution features within a given chip area are aligned to the VG associated with the given chip area, except for those sub-resolution features that are placed between an outermost regular layout feature of the chip area and an adjacent VG interface, in accordance with one embodiment of the present invention. In the example layout of FIG. 7, regular layout shapes 330, 332, 336, and 338 are defined to extend over a diffusion region 364 and are placed according to one of a number of VGs. A first VG defined by virtual lines 301-314 is associated with a first chip area, and a second VG defined by virtual lines 315-327 is associated with a second chip area. Sub-resolution features 340-343 within the first chip area are aligned to the first VG. Sub-resolution features 349-350 within the second chip area are aligned to the second VG. Sub-resolution features 380-383 that are placed between an outermost regular layout feature 332 of the first chip area and the VG interface 360 are not aligned to the VG of the first chip area. Also, sub-resolution features 383-387 that are placed between an outermost regular layout feature 336 of the second chip area and the VG interface 360 are not aligned to the VG of the second chip area.

In the region between the neighboring outermost regular layout features 332 and 336 that extends across the VG interface 360, a local sub-resolution virtual grate (LSVG) is defined by virtual lines 370-377. More specifically, the LSVG is defined by a number of parallel virtual lines 370-377 spaced at a constant pitch. It should be understood that the LSVG is defined independently from both the first VG (301-314) of the first chip area and the second VG (315-327) of the second chip area. Also, the LSVG is defined such that the set of virtual lines 370-377 that define the LSVG is centered within the space between the neighboring outermost regular layout features 332 and 336 of the two interfacing VG areas. For example, The sub-resolution features 380-387 are placed according to the LSVG 370-377.

Figure 8A:
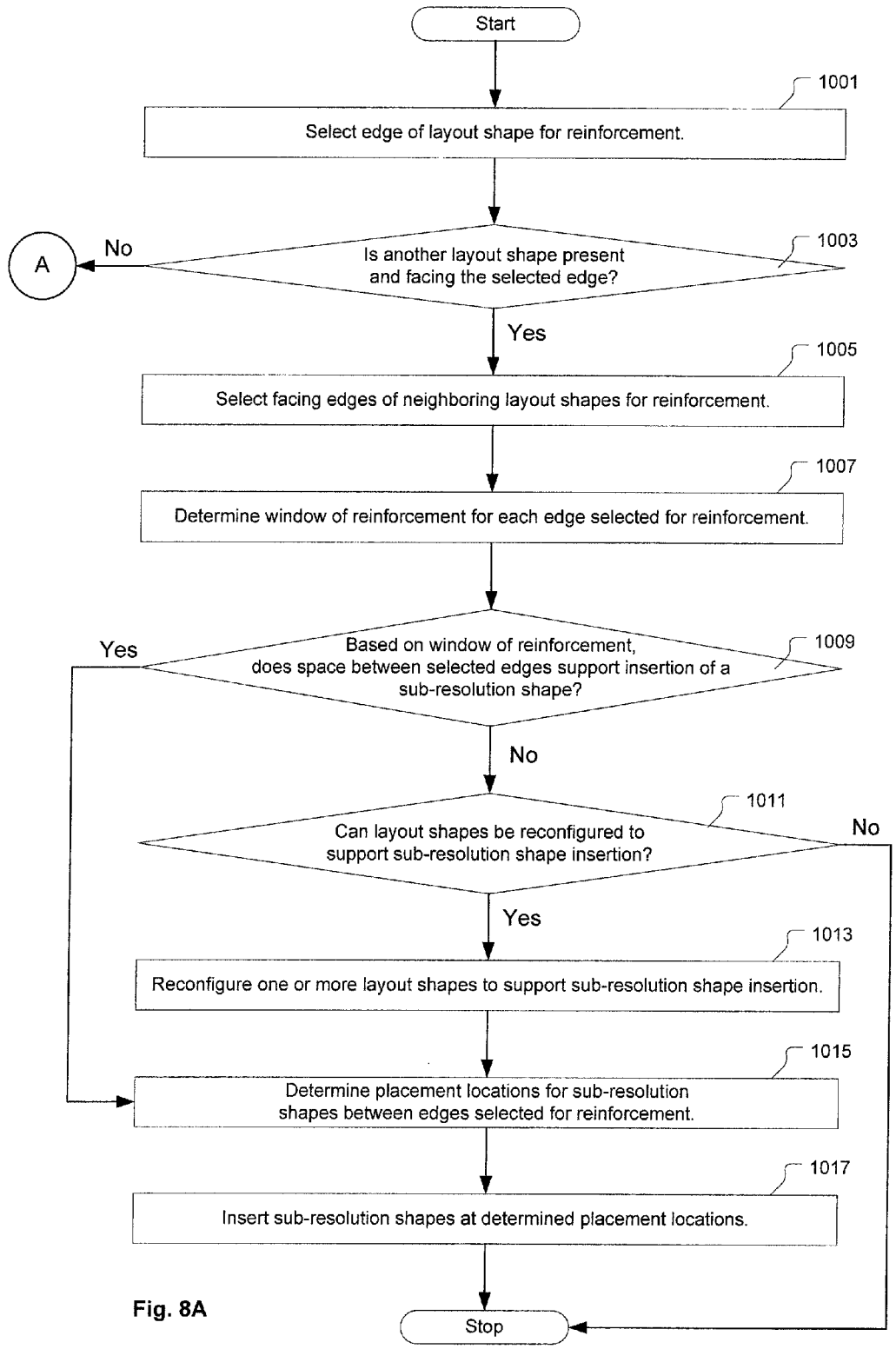
FIGS. 8A-8B show a method for determining the placement of sub-resolution shapes based on regular layout shape edges, in accordance with one embodiment of the present invention.
Figure 8B:
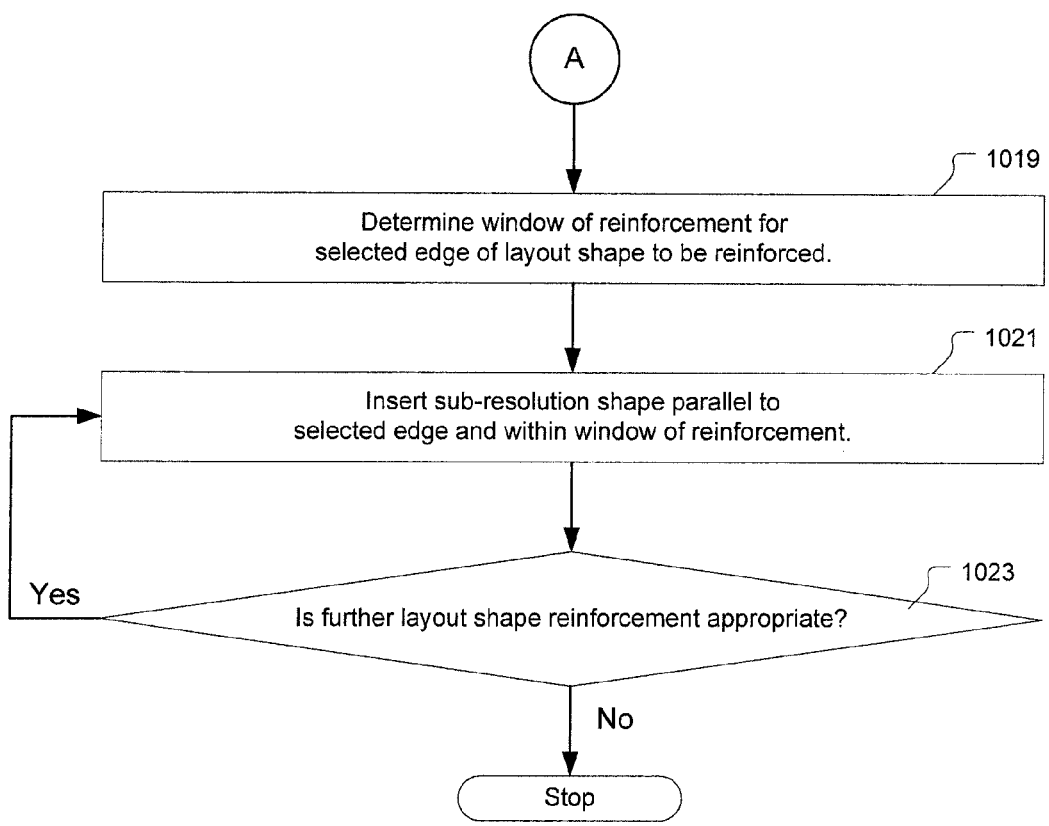
Figure 9A:
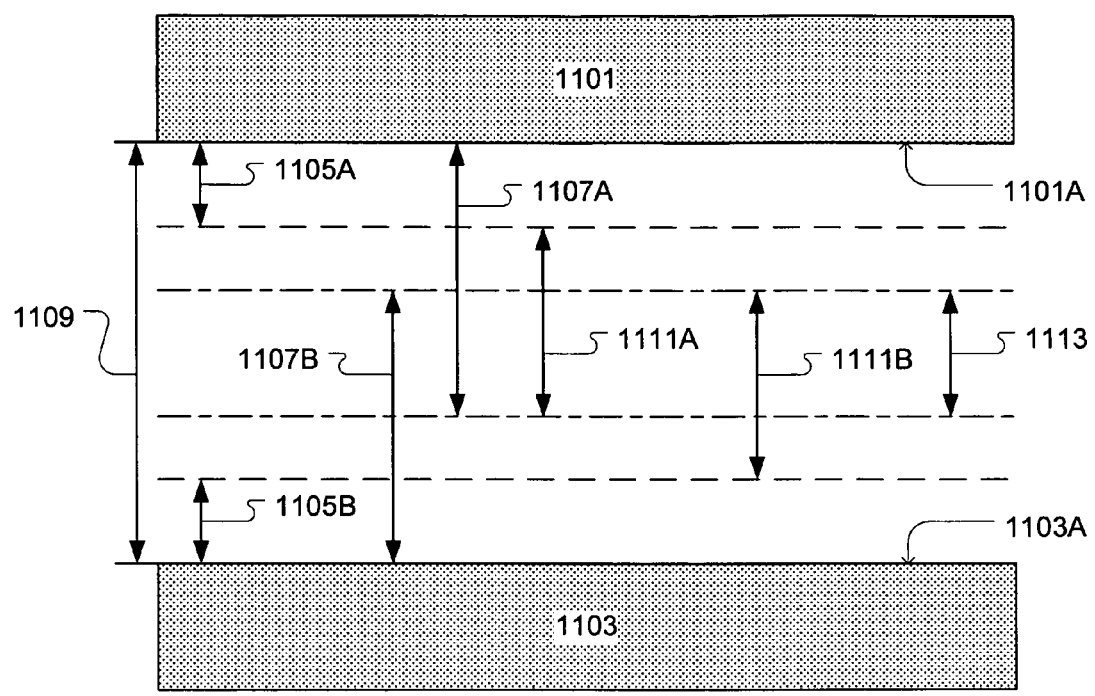
FIG. 9A shows an exemplary layout portion to illustrate various operation of the edge-based method, in accordance with one embodiment of the present invention.

FIGS. 8A-8B show a method for determining the placement of sub-resolution shapes based on regular layout shape edges, referred to as the edge-based method, in accordance with one embodiment of the present invention. The edge-based method includes an operation 1001 for selecting an edge of a regular layout shape to be lithographically reinforced by one or more sub-resolution shapes. The edge selected in operation 1001 is referred to as a first selected edge. FIG. 9A shows an exemplary layout portion to illustrate various operation of the edge-based method, in accordance with one embodiment of the present invention. In FIG. 9A, a layout shape 1101 represents a layout shape to be lithographically reinforced by the edge-based method. An edge 1101A of the layout shape 1101 is selected in the operation 1001 as the first selected edge for lithographic reinforcement by one or more sub-resolution shapes, wherein a sub-resolution shape is to be placed parallel to the first selected edge 1101A so as to face the first selected edge 1101A.

From the operation 1001, the method proceeds with a decision operation 1003 for determining whether or not there is a regular layout shape placed parallel to the first selected edge 1101A and facing the first selected edge 1101A. If there is not a regular layout shape facing the first selected edge 1101A, the method continues with an operation 1019 of FIG. 8B, as discussed further below. If there is a regular layout shape facing the first selected edge 1101A, the method continues with an operation 1005. For example, FIG. 9A shows a regular layout shape 1103 placed parallel to the first selected edge 1101A and facing the first selected edge 1101A. Specifically, the regular layout shape 1103 includes an edge 1103A that faces the first selected edge 1101A. In the operation 1005, an edge of the regular layout shape that faces the first selected edge is selected for lithographic reinforcement and is referred to as a second selected edge. For example, with regard to FIG. 9A, the edge 1103A of the regular layout shape 1103 that faces the first selected edge 1101A is selected for lithographic reinforcement and is referred to as the second selected edge 1103A.

From the operation 1105, the method proceeds with an operation 1007 for determining a window of lithographic reinforcement for each of the first and second selected edges, 1101A and 1103A respectively, that is to be lithographically reinforced. The window of lithographic reinforcement, also referred to as reinforcement window, for a given regular layout shape edge represents an allowable layout area within which a sub-resolution shape can be placed to provide lithographic reinforcement to the given regular layout shape edge, without causing adverse lithographic effects on the regular layout shape to be reinforced or on other neighboring layout shapes whether they be regular layout shapes or sub-resolution shapes. It should be understood that in one embodiment determination of the reinforcement window for a given regular layout shape edge is predicated on the sub-resolution shape being placed parallel to the given regular layout shape edge.

In one embodiment, the operation 1007 includes an operation for determining a minimum space permitted between each of the first and second selected edges, respectively, and a sub-resolution shape such that undesired lithographic effects are prevented. Examples of undesired lithographic effects in this respect may include, but are not limited to, unintentional resolution of a sub-resolution shape, unintentional distortion of a layout shape that should be resolved (regular layout shape), or other adverse effects. For example, with regard to FIG. 9A, operation 1007 includes determining a minimum space 1105A that can be defined between the first selected edge 1101A and a sub-resolution shape. Also, operation 1007 includes determining a minimum space 1105B that can be defined between the second selected edge 1103 and a sub-resolution shape.

Also, in the above-mentioned embodiment, the operation 1007 includes an operation for determining a maximum space permitted between each of the first and second selected edges, respectively, and a sub-resolution shape such that undesired effects are prevented. An example of an undesired effect in this respect may be that the regular layout shape to be lithographically reinforced does not receive lithographic reinforcement due to the sub-resolution shape being placed too far away therefrom. For example, with regard to FIG. 9A, operation 1007 includes determining a maximum space 1107A that can be defined between the first selected edge 1101A and a sub-resolution shape. Also, operation 1007 includes determining a maximum space 1107B that can be defined between the second selected edge 1103A and a sub-resolution shape.

From the operation 1007, the method proceeds with a decision operation 1009 for determining whether or not a space between the first and second selected edges supports insertion of a sub-resolution shape, wherein this determination is based on the reinforcement windows determined in operation 1007 for each of the first and second selected edges, respectively. For example, with regard to FIG. 9A, operation 1009 determines whether or not a space 1109 between the first and second selected edges, 1101A and 1103A respectively, supports insertion of a sub-resolution shape, wherein this determination is based on the reinforcement windows 1111A and 1111B determined in operation 1007 for each of the first and second selected edges, 1101A and 1103A respectively.

In one embodiment, if there is overlap of the reinforcement windows associated with the first and second selected edges, or if there is a space between the reinforcement windows associated with the first and second selected edges, then the space between the first and second selected edges will support insertion of a sub-resolution shape. Otherwise, the space between the first and second selected edges may not support insertion of a sub-resolution shape. For example, with regard to FIG. 9A, an overlap 1113 of the reinforcement windows 1111A and 1111B associated with the first and second selected edges, 1101A and 1103A respectively, indicates that the space 1109 between the first and second selected edges, 1101A and 1103A respectively, will support insertion of a sub-resolution shape.

If operation 1009 determines that the space between the first and second selected edges cannot support insertion of a sub-resolution shape, the method proceeds with an operation 1011 for determining whether or not the regular layout shapes that include the first and second selected edges can be reconfigured, e.g., have their placements in the layout adjusted, to support insertion of a sub-resolution shape therebetween. If the regular layout shapes that include the first and second selected edges cannot be reconfigured, then the method concludes without insertion of a sub-resolution shape between the first and second selected edges. However, if the regular layout shapes that include the first and second selected edges can be reconfigured, then an operation 1013 is performed to reconfigure one or both of these regular layout shapes such that at least one sub-resolution shape can be placed therebetween. It should be understood that the operation 1013 may include reconfiguration of regular layout shapes beyond the regular layout shapes that include the first and second selected edges.

From the operation 1013, the method proceeds with an operation 1015. Also, with reference back to operation 1009, if it is determined that the space between the first and second selected edges can support insertion of a sub-resolution shape, the method proceeds from operation 1009 to the operation 1015. In the operation 1015, placement locations for one or more sub-resolution shapes between the first and second selected edges are determined. The placement locations are determined such that the one or more sub-resolution shapes are placed within the allowable reinforcement windows associated with each of the first and second selected edges, and such that no sub-resolution shape violates the allowable reinforcement windows associated with each of the first and second selected edges. For example, with regard to FIG. 9A, one or more sub-resolution shapes are placed so as to comply with both of the reinforcement windows 1111A and 1111B associated with the first and second selected edges, 1101A and 1103A, respectively. Once the sub-resolution shape placement locations are determined, the method includes an operation 1017 for inserting the sub-resolution shapes at the determined placement locations. Then, the method concludes.

Figure 9B:
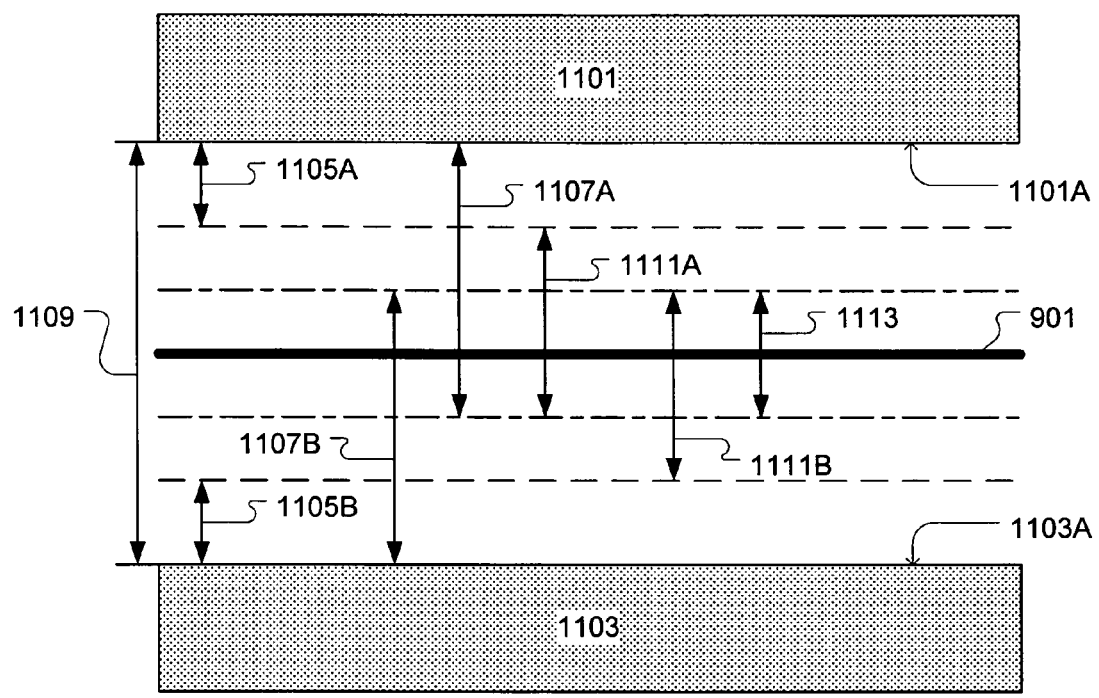
FIG. 9B is an illustration showing the layout of FIG. 9A with one sub-resolution shape placed so as to fall within both of the reinforcement windows and bisect the space between the first and second selected edges, in accordance with one embodiment of the present invention.
Figure 9C:
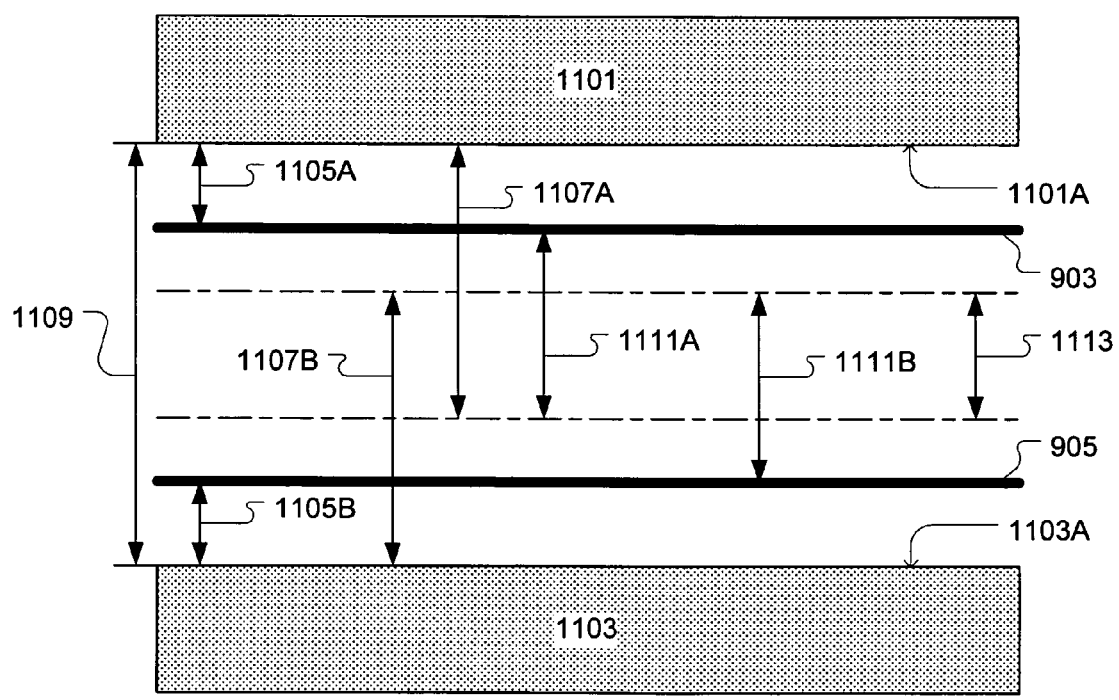
FIG. 9C is an illustration showing the layout of FIG. 9A with two sub-resolution shapes placed so as to fall on a closest boundary of each of the reinforcement windows relative to the first and second selected edges, in accordance with one embodiment of the present invention.
Figure 9D:
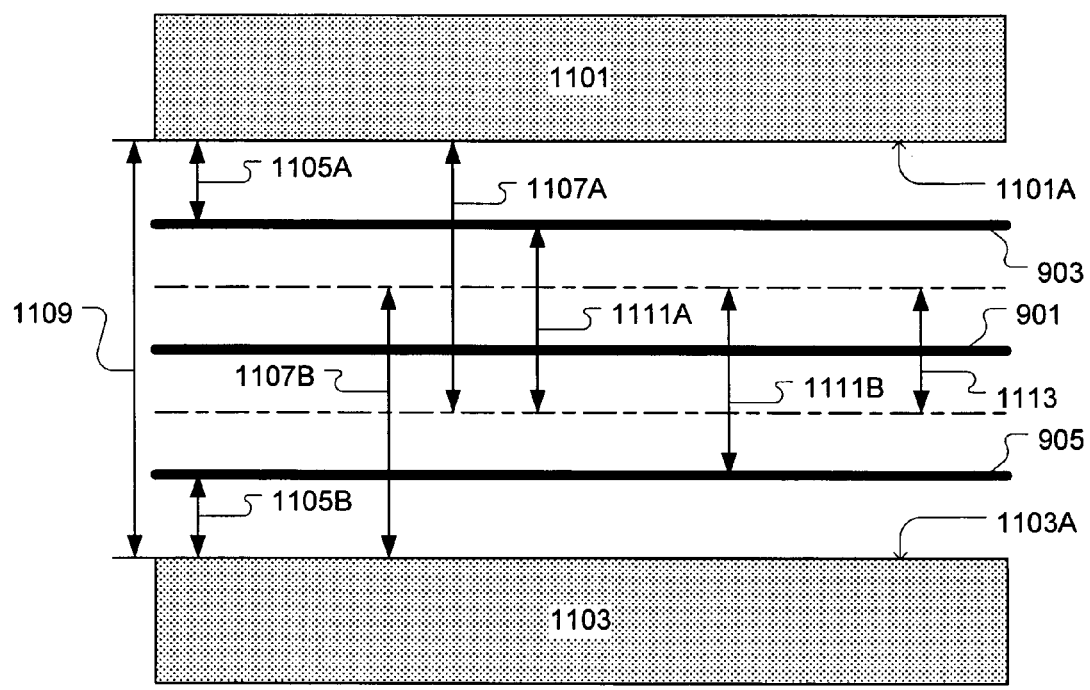
FIG. 9D is an illustration showing the layout of FIG. 9A with three sub-resolution shapes placed so as to fall on a closest boundary of each of the reinforcement windows relative to the first and second selected edges, and so as to bisect the space between the first and second selected edges, in accordance with one embodiment of the present invention.

FIG. 9B is an illustration showing the layout of FIG. 9A with one sub-resolution shape 901 placed so as to fall within both of the reinforcement windows 1111A and 1111B and bisect the space 1109 between the first and second selected edges 1101A and 1103A, respectively, in accordance with one embodiment of the present invention. FIG. 9C is an illustration showing the layout of FIG. 9A with two sub-resolution shapes 903 and 905 placed so as to fall on a closest boundary of each of the reinforcement windows 1111A and 1111B relative to the first and second selected edges 1101A and 1103A, respectively, in accordance with one embodiment of the present invention. FIG. 9D is an illustration showing the layout of FIG. 9A with three sub-resolution shapes 901, 903, and 905 placed so as to fall on a closest boundary of each of the reinforcement windows 1111A and 1111B relative to the first and second selected edges 1101A and 1103A, respectively, and so as to bisect the space 1109 between the first and second selected edges 1101A and 1103A, respectively, in accordance with one embodiment of the present invention. It should be understood that in various embodiments, essentially any number of sub-resolution shapes can be placed between the first and second selected edges and within the respective reinforcement windows, and can be placed in essentially any configuration (where configuration includes relative spacing to each other and to the regular layout shapes that include the first and second selected edges), so long as the sub-resolution shapes do not adversely impact the regular layout shapes and so long as the sub-resolution shapes to not cause each other to resolve.

Figure 10A:
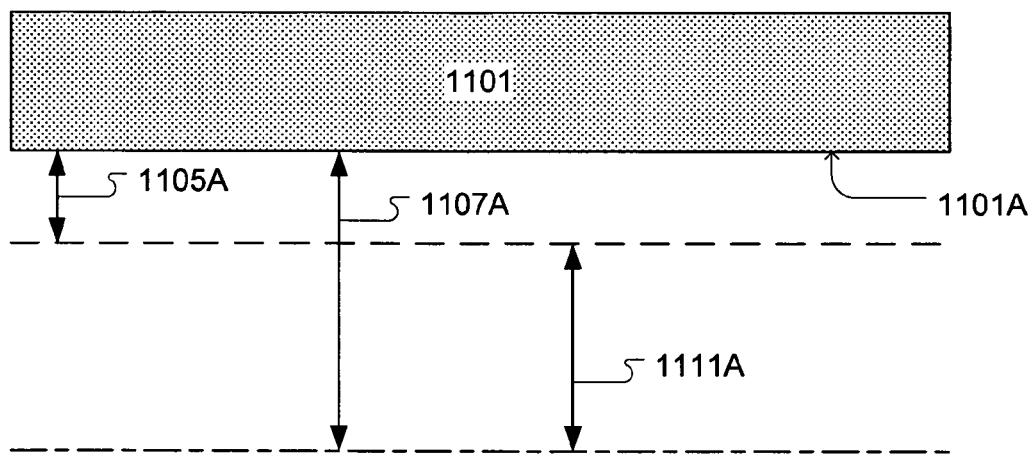
FIG. 10A shows an exemplary layout in which the regular layout shape does not have another regular layout shape facing the first selected edge, in accordance with one embodiment of the present invention.
Figure 10B:
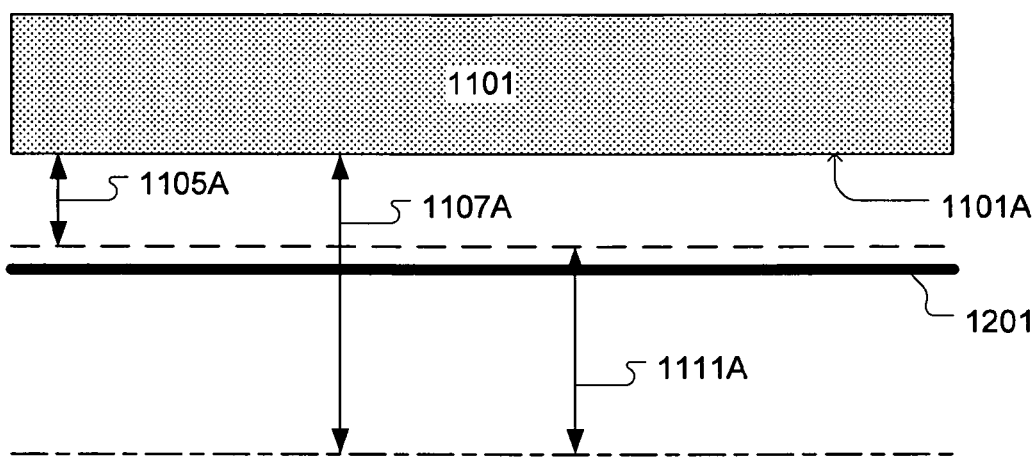
FIG. 10B shows the exemplary layout of FIG. 10A in which a sub-resolution shape is placed parallel to the first selected edge and within the reinforcement window associated with the first selected edge, in accordance with one embodiment of the present invention.

With reference back to operation 1003 of FIG. 8A, if there is not a regular layout shape facing the first selected edge 1101A, the method continues with an operation 1019 of FIG. 8B. This scenario is exemplified by the layout of FIG. 10A in which the regular layout shape 1101 does not have another regular layout shape facing the first selected edge 1101A, in accordance with one embodiment of the present invention. In the operation 1019, a reinforcement window is determined for the first selected edge. As previously described with regard to FIG. 9A, the reinforcement window 1111A for regular layout shape 1101 is defined between the minimum space 1105A and the maximum space 1107A. From the operation 1019, the method proceeds with an operation 1021 in which a sub-resolution shape is placed parallel to the first selected edge and within the reinforcement window associated with the first selected edge. For example, FIG. 10B is an illustration showing the layout of FIG. 10A in which a sub-resolution shape 1201 is placed parallel to the first selected edge 1101A and within the reinforcement window 1111A associated with the first selected edge 1101A, in accordance with one embodiment of the present invention. In one embodiment, the sub-resolution shape is placed in operation 1021 such that the sub-resolution shape provides optimal reinforcement of the regular layout shape that includes the selected edge, without causing resolution of any previously placed sub-resolution shape.

Figure 10C:
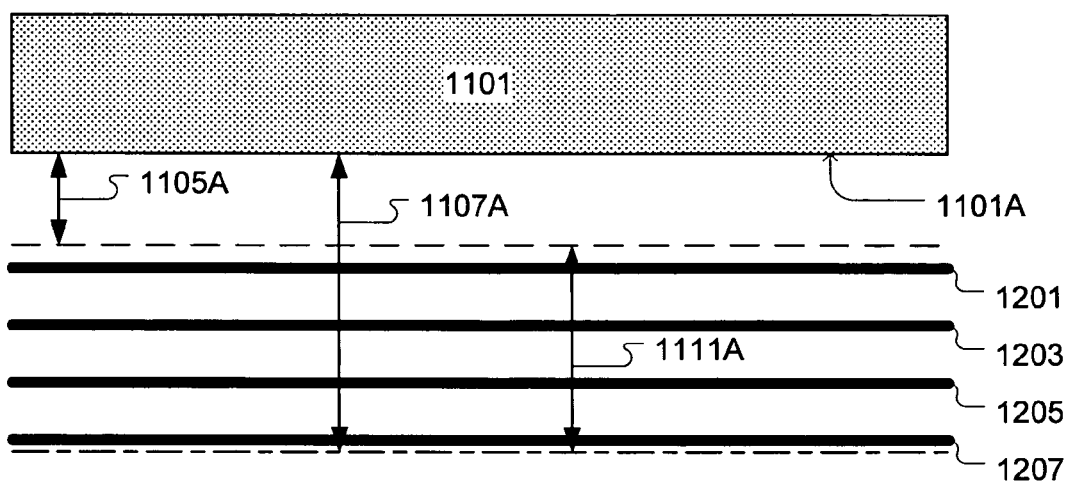
FIG. 10C is an illustration showing the layout of FIG. 10B following placement of a number of additional sub-resolution shapes, in accordance with one embodiment of the present invention.

From the operation 1021, the method proceeds with an operation 1023 in which a determination is made as to whether or not further lithographic reinforcement of the regular layout shape that includes the selected edge is appropriate. If it is determined that placement of an additional sub-resolution shape is not appropriate, then the method concludes. Otherwise, if it is determined that placement of an additional sub-resolution shapes is appropriate, the method reverts back to the operation 1021. It should be understood that the appropriateness of further lithographic reinforcement by way of an additional sub-resolution shape insertion is based on consideration of whether the additional sub-resolution shape will provide meaningful reinforcement to the regular layout shape, and whether the additional sub-resolution shape will adversely compromise the non-resolution of previously placed sub-resolution shapes, and whether sufficient layout area is available for placement of an additional sub-resolution shape. FIG. 10C is an illustration showing the layout of FIG. 10B following placement of a number of additional sub-resolution shapes 1203, 1205, 1207, in accordance with operations 1023 and 1021, in accordance with one embodiment of the present invention.

Figure 8C:
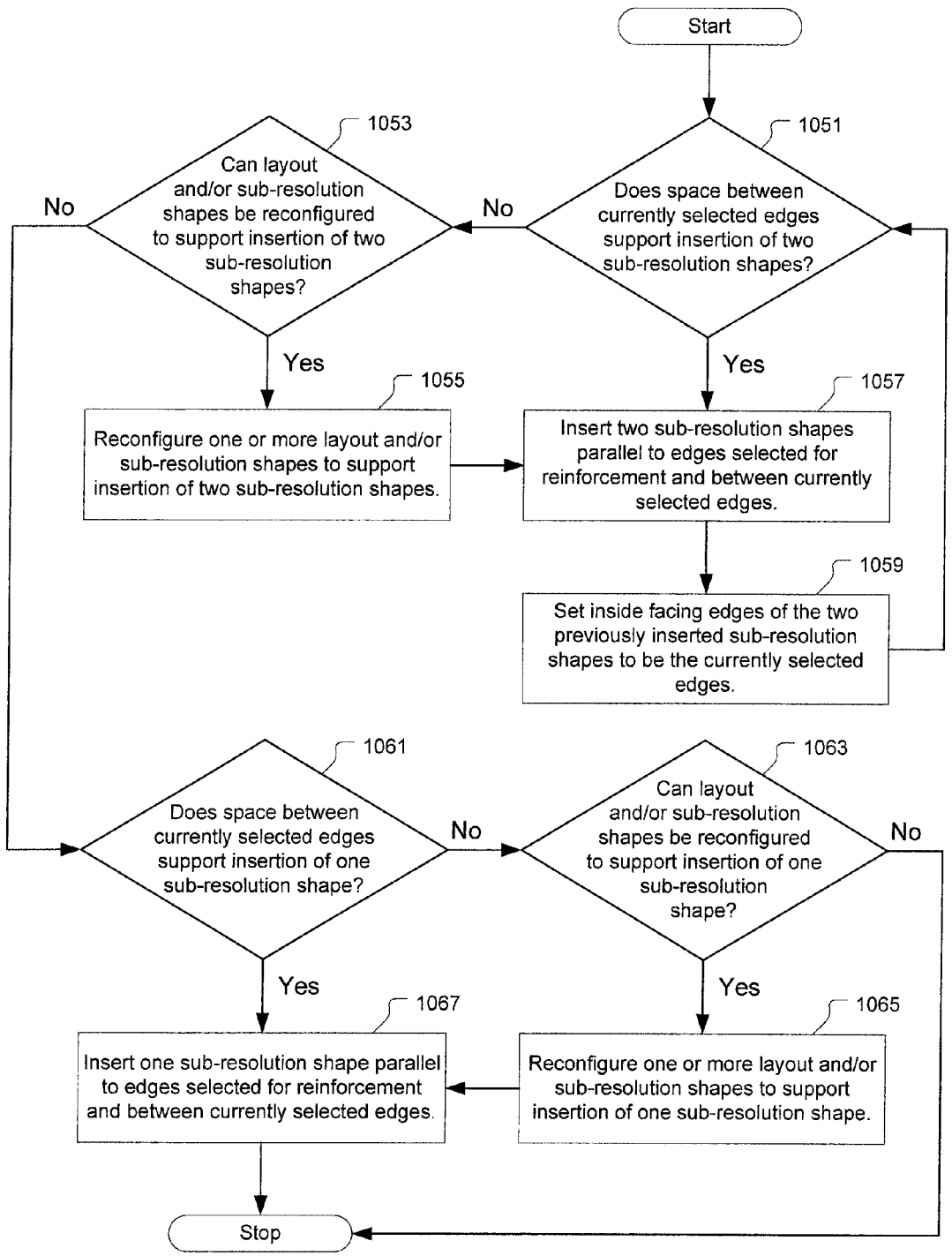
FIG. 8C is an illustration showing a flowchart of a method for determining placement locations for one or more sub-resolution shapes between the first and second selected edges, in accordance with one embodiment of the present invention.

FIG. 8C is an illustration showing a flowchart of a method for determining placement locations for one or more sub-resolution shapes between the first and second selected edges, as specified in operation 1015 of the method of FIG. 8A, in accordance with one embodiment of the present invention. It should be understood that the method of FIG. 8C corresponds to one embodiment for performing operation 1015, and is therefore performed subsequent to either operation 1009 or operation 1013 of the method of FIG. 8A. Therefore, the method of FIG. 8C is based on placement of sub-resolution shapes within a layout space between a first selected edge of a first regular layout shape and a second selected edge of a second regular layout shape. The first and second regular layout shapes are linearly shaped and oriented to extend across the layout in a parallel orientation. Also, the sub-resolution shapes are placed in the layout space between the first and second selected edges so as to extend across the layout in a parallel orientation with respect to the first and second selected edges.

The method of FIG. 8C begins with a decision operation 1051 for determining whether the layout space between currently selected shape edges supports insertion of two sub-resolution shapes. It should be understood that at the initial entry into the operation 1051, the currently selected shape edges refer to the first and second selected edges of the regular layout shapes as selected in operations 1001 and 1005, respectively. The determination of operation 1051 is based on the reinforcement windows determined in operation 1007 for each of the first and second selected edges, respectively, and on a layout distance extending perpendicularly between the first and second selected edges. If a first sub-resolution shape can be placed at the minimum spacing of the reinforcement window associated with the first selected edge, and if a second sub-resolution shape can be placed at the minimum spacing of the reinforcement window associated with the second selected edge, and if these first and second sub-resolution shapes are spaced sufficiently apart to avoid sub-resolution shape resolution, then it is determined in operation 1051 that two sub-resolution shapes can be placed between the currently selected edges, i.e., between the first and second selected edges.

Figure 11A:
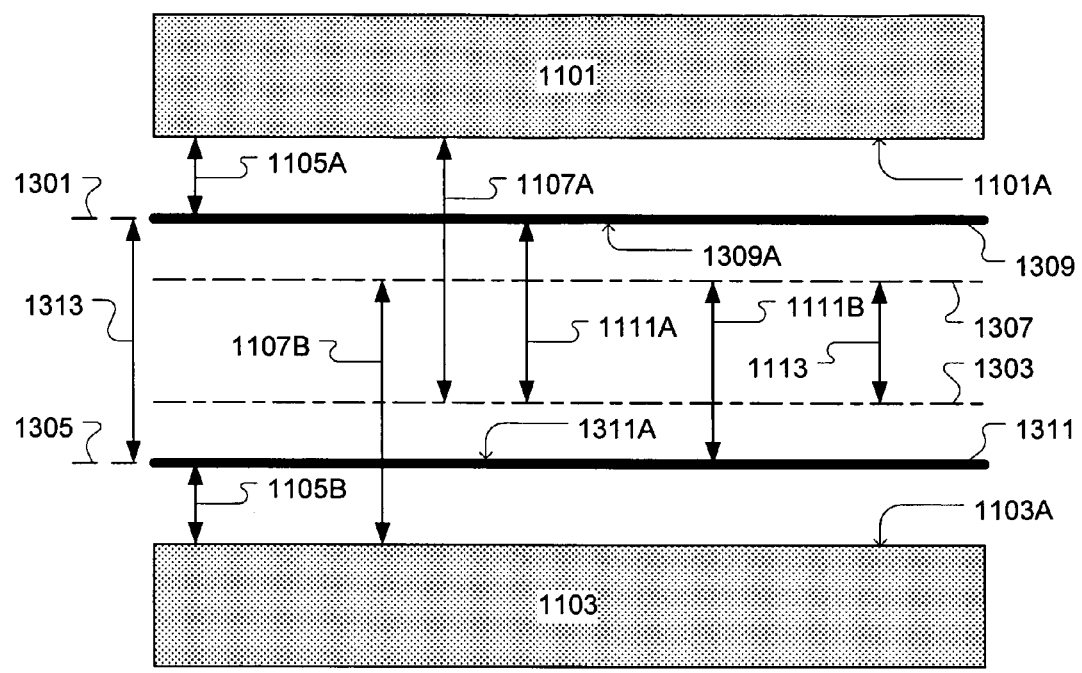
FIG. 11A illustrates operation 1051 of the method of FIG. 8C within the context of the exemplary layout of FIG. 9A, in accordance with one embodiment of the present invention.

FIG. 11A illustrates the above-described decision operation 1051 within the context of the exemplary layout of FIG. 9A, in accordance with one embodiment of the present invention. The reinforcement window 1111A associated with the first regular layout shape 1101 extends from a line 1301 to a line 1303, wherein the line 1301 represents the minimum space 1105A that can be defined between the first selected edge 1101A and a sub-resolution shape, and wherein the line 1303 represents the maximum space 1107A that can be defined between the first selected edge 1101A and a sub-resolution shape. The reinforcement window 1111B associated with the second regular layout shape 1103 extends from a line 1305 to a line 1307, wherein the line 1305 represents the minimum space 1105B that can be defined between the second selected edge 1103A and a sub-resolution shape, and wherein the line 1307 represents the maximum space 1107B that can be defined between the first selected edge 1103A and a sub-resolution shape. If a first sub-resolution shape 1309 can be placed at the minimum spacing 1105A of the reinforcement window 1111A associated with the first selected edge 1101A, and if a second sub-resolution shape 1311 can be placed at the minimum spacing 1105B of the reinforcement window 1111B associated with the second selected edge 1103A, and a spacing 1313 between the first and second sub-resolution shapes, 1309 and 1311 respectively, is sufficiently large to avoid sub-resolution shape resolution, then it is determined in operation 1051 that two sub-resolution shapes can be placed between the first and second selected edges, 1101A and 1103A respectively.

If decision operation 1051 determines that two sub-resolution shapes can be inserted between the currently selected edges, then the method proceeds with an operation 1057 for inserting two sub-resolution shapes parallel to the currently selected edges, between the currently selected edges, and respectively within the reinforcement windows associated with each of the currently selected edges. It should be appreciated that in one embodiment each of the two sub-resolution shapes is inserted at a layout position to maximize their reinforcement impact on a regular layout shape, without causing resolution of any previously inserted sub-resolution shape. In one embodiment, each of the two sub-resolution shapes is inserted at the minimum spacing of the reinforcement window associated with each of the currently selected edges, respectively. For example, in FIG. 11A the sub-resolution shape 1309 is inserted at the minimum spacing 1105A of the reinforcement window 1111A associated with the currently selected edge 1101A, and the sub-resolution shape 1311 is inserted at the minimum spacing 1105B of the reinforcement window 1111B associated with the currently selected edge 1103A. However, it should be understood that in other embodiments the two sub-resolution shapes can be respectively placed within reinforcement windows associated with the currently selected edges, so long as the placements of the sub-resolution shapes do not cause the sub-resolution shapes to resolve during manufacturing.

Additionally, it should be understood that in an embodiment where the two regular layout shapes are spaced sufficiently apart, the two sub-resolution shapes can be inserted between the currently selected edges so as to comply with the minimum spacing requirement between reinforcement windows and their respective regular layout shapes, and so as to comply with the minimum spacing requirement between adjacent sub-resolution shapes, and yet be inserted beyond either of the reinforcement windows associated with the regular layout shapes to be reinforced. It should be understood that in this embodiment, the sub-resolution shapes inserted beyond either of the reinforcement windows associated with the regular layout shapes may serve to amplify the lithographic reinforcement of the regular layout shapes as provided by sub-resolution shapes that are inserted within the neighboring reinforcement windows.

From the operation 1057, the method proceeds with an operation 1059 in which facing edges of the two previously inserted sub-resolution shapes are designated as the currently selected edges. For example, with regard to FIG. 11A, the facing edges 1309A and 1311A of the two previously inserted sub-resolution shapes 1309 and 1311, respectively, are designated as the currently selected edges. From the operation 1059, the method reverts back to the decision operation 1051.

If decision operation 1051 determines that two sub-resolution shapes cannot be inserted between the currently selected edges, then the method proceeds with a decision operation 1053 for determining whether regular layout shapes and/or previously inserted sub-resolution shapes can be reconfigured to support insertion of two sub-resolution shapes within the layout space between the currently selected edges. It should be understood that reconfiguration of regular layout shapes should be done so as to ensure that the reconfigured regular layout shapes remain compliant with applicable design rules and/or applicable architecture specifications, e.g., dynamic array architecture specifications. It should also be understood that reconfiguration of previously inserted sub-resolution shapes should be done so as to ensure that the reconfigured sub-resolution shapes remain within their associated reinforcement windows and do not cause resolution of sub-resolution shapes during manufacturing. Also, it should be noted that as regular layout shapes are reconfigured, the configuration of their corresponding reinforcement windows will follow suit, and some of the reinforcement windows may change in size and/or proximity to their respective regular layout shape.

If decision operation 1053 determines that regular layout shapes and/or previously inserted sub-resolution shapes can be reconfigured to support insertion of two sub-resolution shapes within the layout space between the currently selected edges, then the method proceeds with an operation 1055 for reconfiguring one or more regular layout shapes and/or one or more sub-resolution shapes to support insertion of two sub-resolution shapes between the currently selected edges. Such reconfiguration may include, but is not limited to, the techniques of: 1) changing placement location of one or more regular layout shapes to be lithographically reinforced, 2) changing placement location of one or more neighboring layout shapes (including regular layout shapes and/or sub-resolution shapes), 3) modification of a given regular layout shape dimension to change its edge location. From the operation 1055, the method proceeds to the operation 1057 for inserting two sub-resolution shapes, as previously discussed.

If decision operation 1053 determines that regular layout shapes and/or previously inserted sub-resolution shapes cannot be reconfigured to support insertion of two sub-resolution shapes within the layout space between the currently selected edges, then the method proceeds with an operation 1061 for determining whether the layout space between the currently selected edges supports insertion of one sub-resolution shape. In one embodiment, the currently selected edges at operation 1061 correspond to facing edges of two parallel regular layout shapes. In this embodiment, if the distance extending perpendicularly between the currently selected edges is greater than or equal to the sum of the minimum spaces between the regular layout shapes and their corresponding reinforcement windows, then the layout space between the currently selected edges supports insertion of one sub-resolution shape. For example, with reference back to FIG. 9A, if the distance 1109 is greater than or equal to the sum of the spacing 1105A and 1105B, then the layout space between the currently selected edges supports insertion of one sub-resolution shape.

In another embodiment, the currently selected edges at operation 1061 correspond to facing edges of two previously inserted sub-resolution shapes. In this embodiment, if the distance extending perpendicularly between the currently selected edges is at least twice the minimum required separation distance between adjacent sub-resolution shapes (so as to ensure that sub-resolution shapes do not resolve during manufacturing), then the layout space between the currently selected edges supports insertion of one sub-resolution shape.

If decision operation 1061 determines that one sub-resolution shapes can be inserted between the currently selected edges, then the method proceeds with an operation 1067 for inserting one sub-resolution shape parallel to the currently selected edges and between the currently selected edges. In one embodiment, the one sub-resolution shape is placed so as to bisect the layout space between the currently selected edges. In another embodiment, the one sub-resolution shape is placed closer to one of the currently selected edges than the other, so as to preferentially reinforce resolution of one regular layout shape relative to the other. It should be appreciated, though, that placement of the one sub-resolution in this embodiment satisfies the minimum spacing required between adjacent sub-resolution shapes.

Additionally, it should be understood that the one sub-resolution shape in operation 1067 may or may not fall within a reinforcement window. For example, in an embodiment where the two regular layout shapes are spaced sufficiently apart, the one sub-resolution shape can be inserted between the currently selected edges so as to comply with the minimum spacing requirement between reinforcement windows and their respective regular layout shapes, and so as to comply with the minimum spacing requirement between adjacent sub-resolution shapes, and yet be inserted beyond either of the reinforcement windows associated with the regular layout shapes to be reinforced. It should be understood that in this embodiment, the one sub-resolution shape inserted beyond either of the reinforcement windows associated with the regular layout shapes may serve to amplify the lithographic reinforcement of the regular layout shapes as provided by sub-resolution shapes that are inserted within the neighboring reinforcement windows.

Figure 11B:
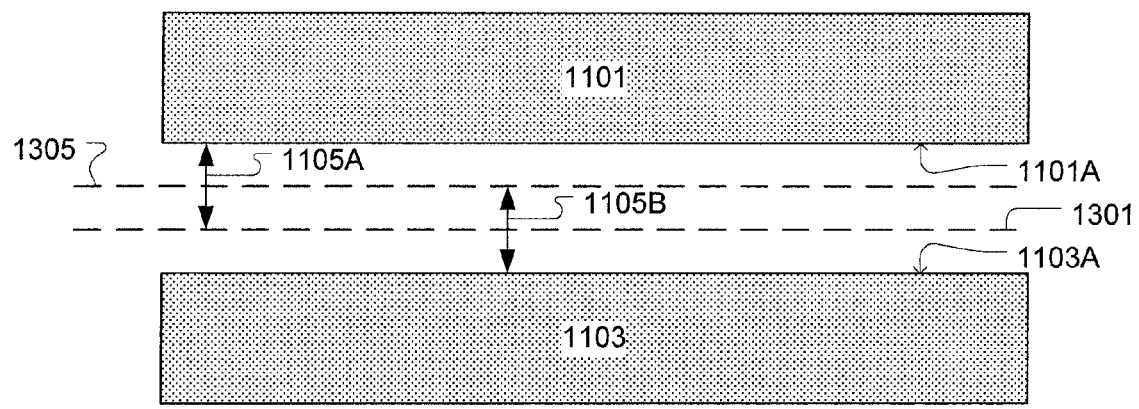
FIG. 11B shows a variation of the exemplary layout of FIG. 11A in which the minimum space between the regular layout shape and its reinforcement window encroaches within the minimum space between the other regular layout shape and its reinforcement window, in accordance with one embodiment of the present invention.

With reference back to the decision operation 1061, if the minimum space between one of the regular layout shapes and its reinforcement window encroaches within the minimum space between the other regular layout shape and its reinforcement window, then the layout space between the currently selected edges does not support insertion of one sub-resolution shape. For example, FIG. 11B shows a variation of the exemplary layout of FIG. 11A in which the minimum space 1105A between the regular layout shape 1101 and its reinforcement window encroaches within the minimum space 1105B between the other regular layout shape 1103 and its reinforcement window, in accordance with one embodiment of the present invention. Therefore, in operation 1061 it is determined that the layout space between the currently selected edges 1101A and 1103A in the exemplary layout of FIG. 11B does not support insertion of one sub-resolution shape.

If decision operation 1061 determines that one sub-resolution shapes cannot be inserted between the currently selected edges, then the method proceeds with an operation 1063 for determining whether regular layout shapes and/or previously inserted sub-resolution shapes can be reconfigured to support insertion of one sub-resolution shape within the layout space between the currently selected edges. It should be understood that reconfiguration of regular layout shapes should be done so as to ensure that the reconfigured regular layout shapes remain compliant with applicable design rules and/or applicable architecture specifications, e.g., dynamic array architecture specifications. It should also be understood that reconfiguration of previously inserted sub-resolution shapes should be done so as to ensure that the reconfigured sub-resolution shapes remain within their associated reinforcement windows and do not cause resolution of sub-resolution shapes during manufacturing. Also, it should be noted that as regular layout shapes are reconfigured, the configuration of their corresponding reinforcement windows will follow suit, and some of the reinforcement windows may change in size and/or proximity to their respective regular layout shape.

If decision operation 1063 determines that regular layout shapes and/or previously inserted sub-resolution shapes can be reconfigured to support insertion of one sub-resolution shape within the layout space between the currently selected edges, then the method proceeds with an operation 1065 for reconfiguring one or more regular layout shapes and/or one or more sub-resolution shapes to support insertion of one sub-resolution shape between the currently selected edges. Such reconfiguration may include, but is not limited to, the techniques of: 1) changing placement location of one or more regular layout shapes to be lithographically reinforced, 2) changing placement location of one or more neighboring layout shapes (including regular layout shapes and/or sub-resolution shapes), 3) modification of a given regular layout shape dimension to change its edge location. From the operation 1065, the method proceeds to the operation 1067 for inserting one sub-resolution shape, as previously discussed. If decision operation 1063 determines that regular layout shapes and/or previously inserted sub-resolution shapes cannot be reconfigured to support insertion of one sub-resolution shape within the layout space between the currently selected edges, then the method concludes. Also, following the operation 1067, the method concludes.

Figure 12:
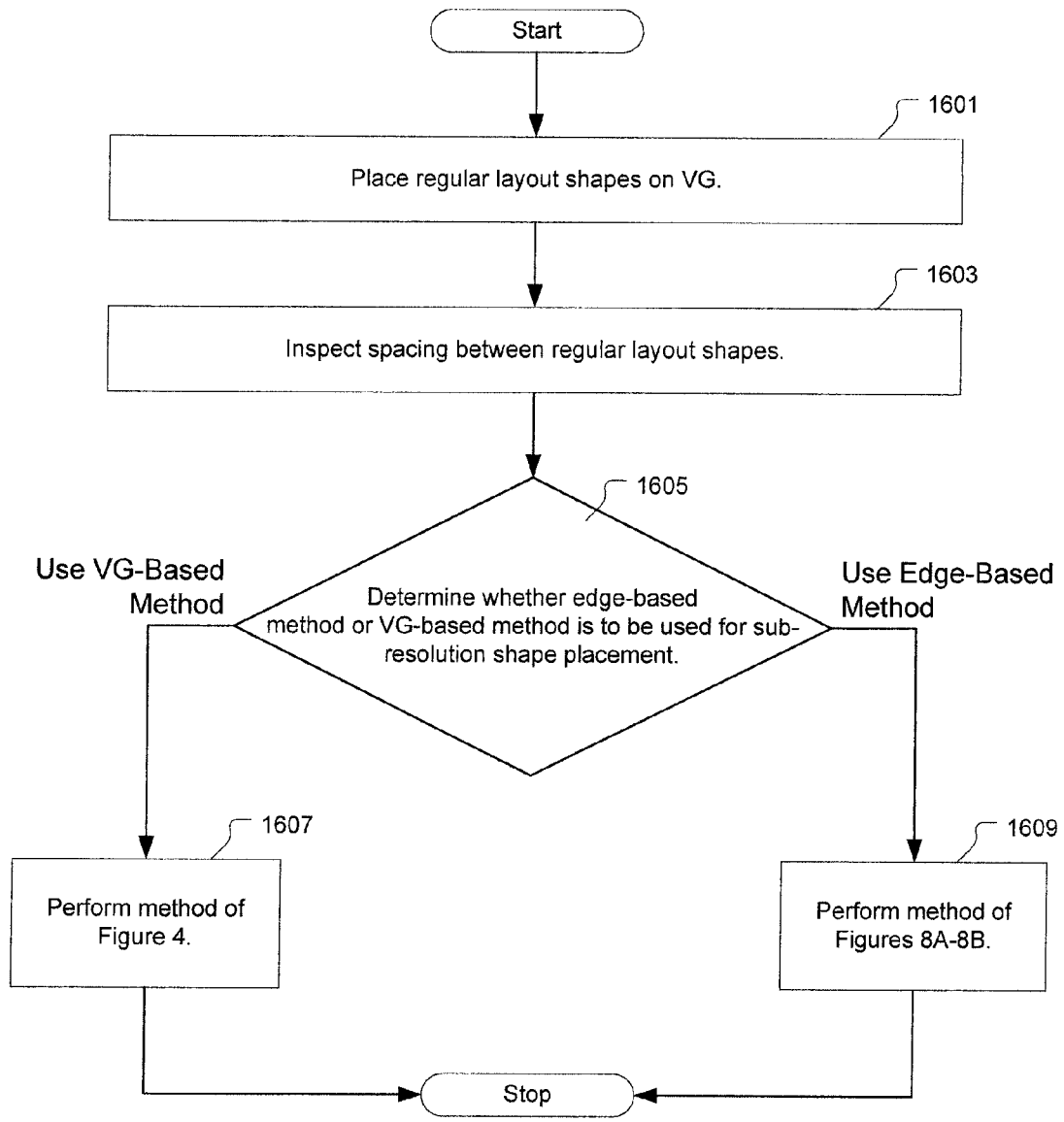
FIG. 12 is an illustration showing a flowchart of a method for using sub-resolution shapes to reinforce regular layout shapes in a lithographic process, in accordance with one embodiment of the present invention.

FIG. 12 is an illustration showing a flowchart of a method for using sub-resolution shapes to reinforce regular layout shapes in a lithographic process, in accordance with one embodiment of the present invention. The method includes an operation 1601 for placing regular layout shapes on a VG. The method also includes an operation 1603 for inspecting spacings between the regular layout shapes. The method also includes a decision operation 1605 (performed based on the spacing inspection of operation 1063) for determining whether the edge-based method of FIGS. 8A-8B is to be used for placing sub-resolution shapes, or whether the VG-based method of FIG. 4 is to be used for placing sub-resolution shapes. The determination of operation 1605 may be based on prediction of which method (edge-based versus VG-based) will result in better manufacturing results, prediction of which method will result in improved chip area utilization, or a combination of these predictions and other factors. If the edge-based method is to be used for placing the sub-resolution shapes, then the method of FIG. 12 continues with an operation 1609 in which the edge-based method of FIGS. 8A-8B is performed. Otherwise, if the VG-based method is to be used for placing sub-resolution shapes, then the method continues with an operation 1607 in which the VG-based method of FIG. 4 is performed.

Figure 13A:
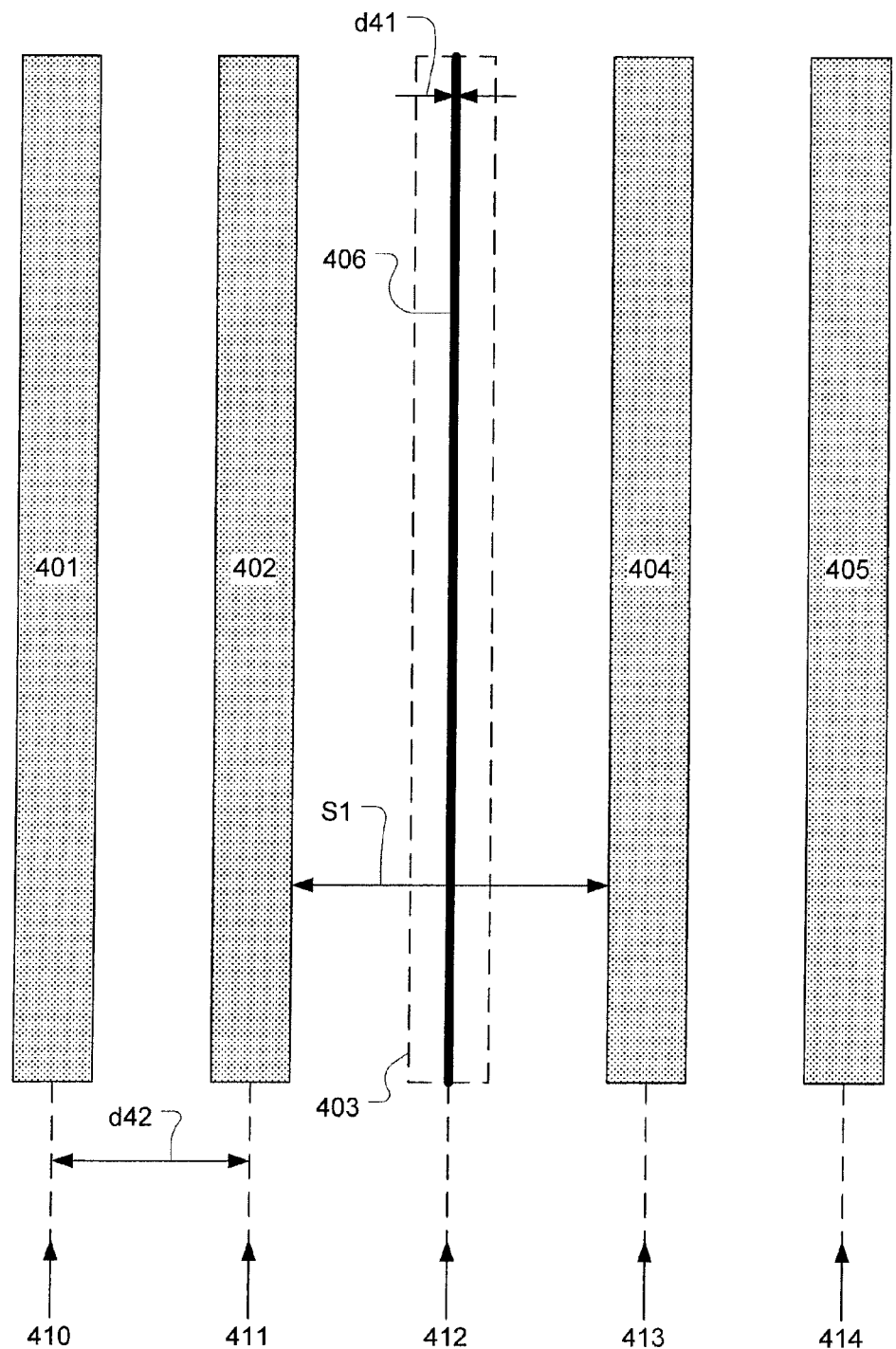
FIG. 13A shows an exemplary layout in which a number of linear regular layout shapes are placed according to a virtual grate, in accordance with one embodiment of the present invention.

In another embodiment, a sub-resolution shape is inserted to replace a regular layout shape that has been removed from the layout for any number of reasons, such as to reduce capacitance. FIG. 13A shows an exemplary layout in which a number of linear regular layout shapes 401-405 are placed according to a VG defined by virtual lines 410-414, respectively, having a pitch d42, in accordance with one embodiment of the present invention. The regular layout shape 403 may be removed from the layout to reduce a capacitance between regular layout shapes 402 and 404. A sub-resolution shape 406 can be inserted in place of the regular layout shape 403 and on the virtual line 412 of the VG. The sub-resolution shape 406 has a width of d41 and is able to lithographically reinforce the regular layout shapes 401, 402, 404 and 405. However, because the sub-resolution shape 406 is not formed in the manufacturing stage, a larger spacing S1 exists between the conductors formed by the regular layout shapes 402 and 404, and hence the capacitance between conductors formed by the regular layout shapes 402 and 404 is reduced.

Figure 13B:
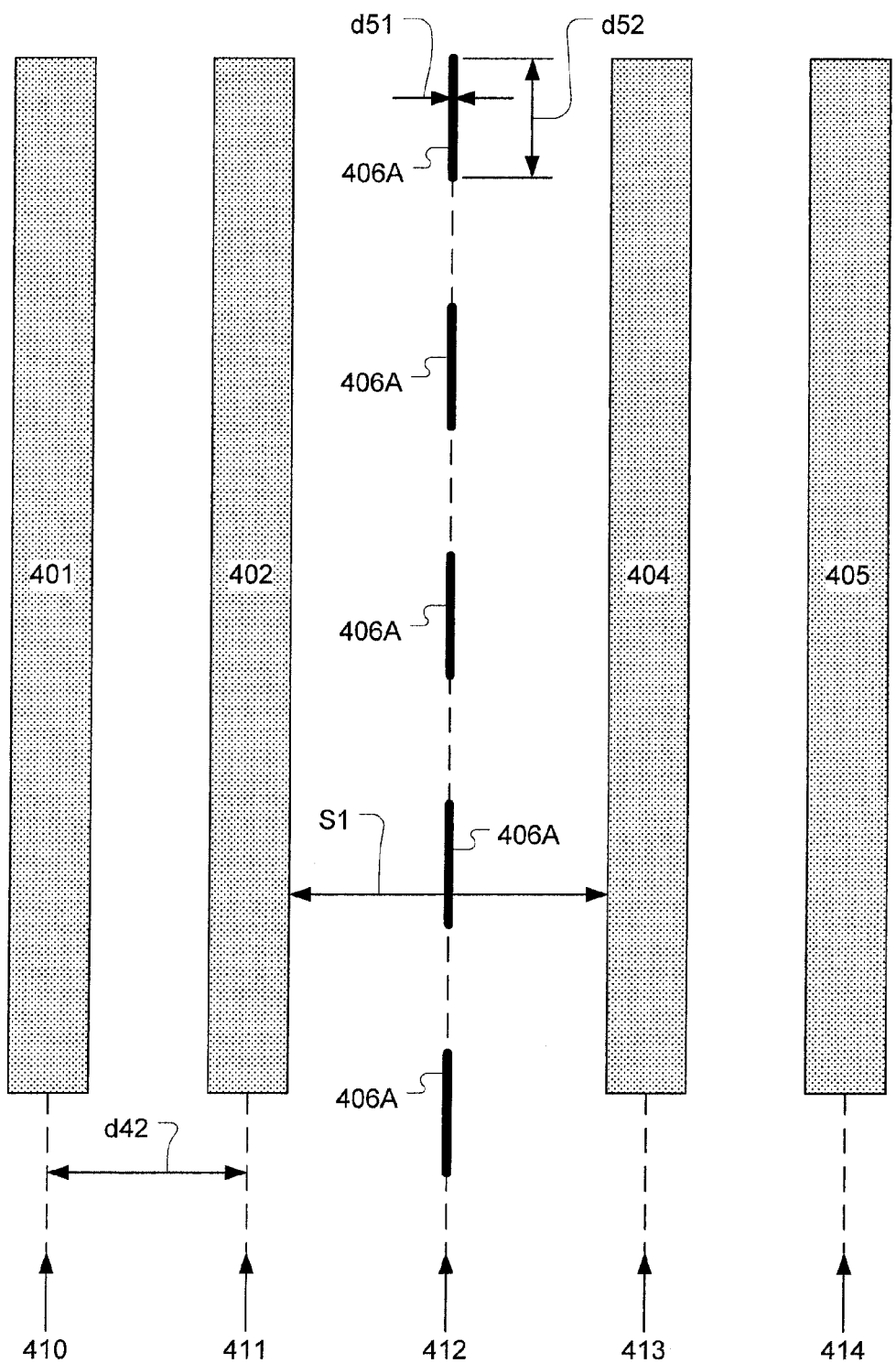
FIG. 13B shows the exemplary layout of FIG. 13A in which a sub-resolution shape is replaced by a segmented sub-resolution shape, in accordance with one embodiment of the present invention.

In some embodiments it may be possible for sub-resolution shapes to inadvertently resolve into a manufactured shape. Causes for undesired resolution of a given sub-resolution shape may include a length of the given sub-resolution shape, unintentional lithographic reinforcement of the given sub-resolution shape by other layout shapes, or other causes. In one embodiment, to prevent resolution of sub-resolution shapes, the sub-resolution shapes are segmented along their length. For example, FIG. 13B shows the exemplary layout of FIG. 13A in which the sub-resolution shape 406 is replaced by a segmented sub-resolution shape 406A, in accordance with one embodiment of the present invention. The segmented sub-resolution shape 406A is defined by a width d51 and a segment length d52. Although the segmented sub-resolution shape 406A is not continuous along the length of the neighboring regular layout shapes (401, 402, 404, 405), the segmented sub-resolution shape 406A will still provide a level of lithographic reinforcement to the neighboring regular layout shapes (401, 402, 404, 405). Also, it should be appreciated that segmentation of the segmented sub-resolution shape 406A assists in preventing lithographic resolution of the segmented sub-resolution shape 406A during manufacturing.

Additionally, when segmented sub-resolution shapes are placed next to each other, the gaps between segments of one segmented sub-resolution shape can be positioned in a particular manner with respect to the gaps between segments of an adjacent segmented sub-resolution shape. For example, in one embodiment, the segment-to-segment gaps of one segmented sub-resolution shape may be offset from the segment-to-segment gaps of an adjacent segmented sub-resolution shape, such that the segment-to-segment gaps of the two segmented sub-resolution shapes do not align in a direction perpendicular to the two segmented sub-resolution shapes. In another embodiment, the segment-to-segment gaps of two adjacent segmented sub-resolution shapes may be aligned in a direction perpendicular to the two segmented sub-resolution shapes.

Figure 14:
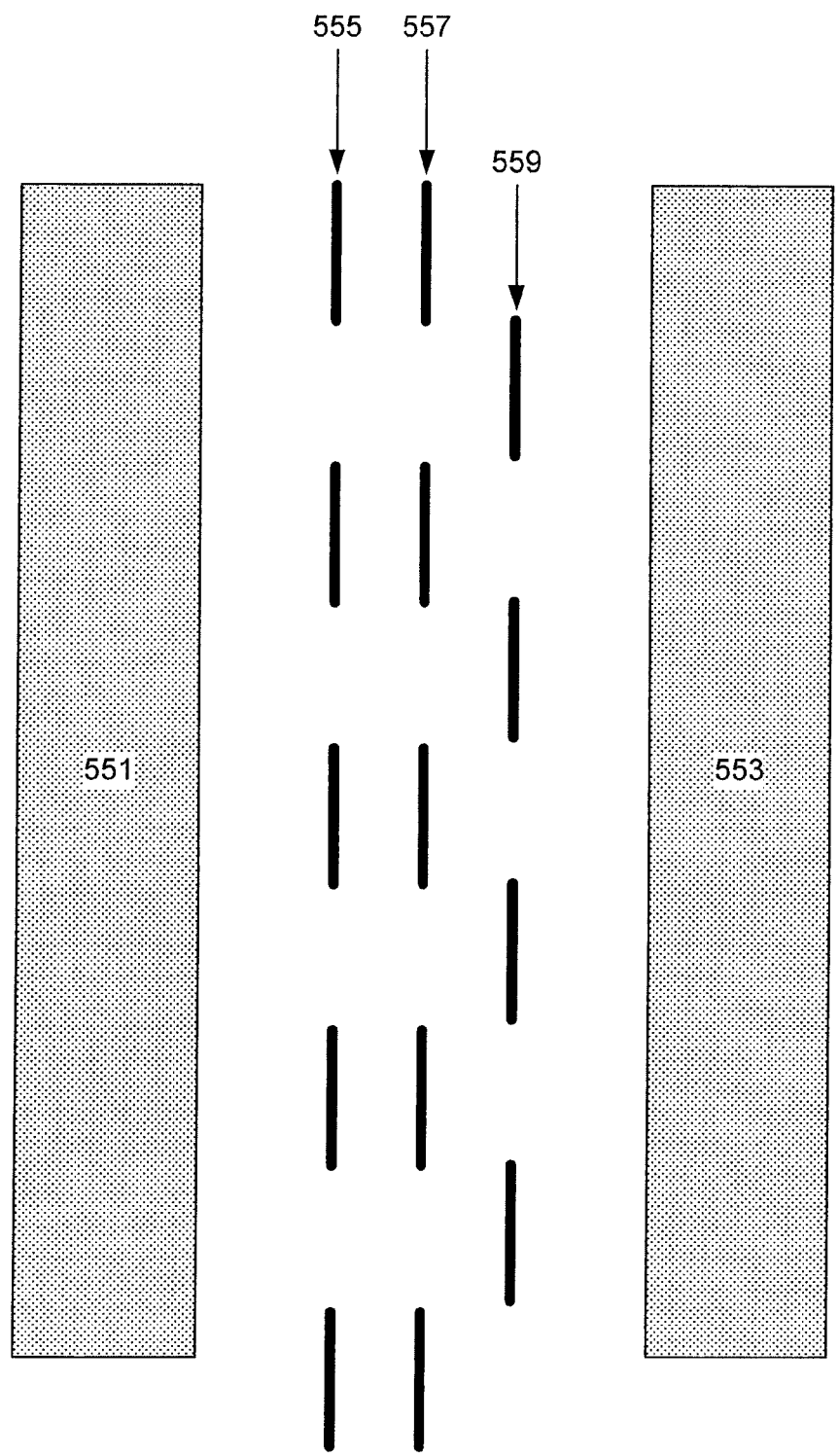
FIG. 14 shows an exemplary layout that includes two regular layout shapes having three segmented sub-resolution shapes placed therebetween, in accordance with one embodiment of the present invention.

For example, FIG. 14 shows an exemplary layout that includes two regular layout shapes 551 and 553 having three segmented sub-resolution shapes 555, 557, 559 placed therebetween, in accordance with one embodiment of the present invention. The segment-to-segment gaps of the segmented sub-resolution shape 557 are offset from the segment-to-segment gaps of adjacent segmented sub-resolution shape 559, such that the segment-to-segment gaps of the two segmented sub-resolution shapes 557 and 559 do not align in a direction perpendicular to the two segmented sub-resolution shapes 557 and 559. Also, the segment-to-segment gaps of the two adjacent segmented sub-resolution shapes 555 and 557 are aligned in a direction perpendicular to the two segmented sub-resolution shapes 555 and 557.

It should be understood that the method for sub-resolution shape utilization as disclosed herein can be implemented in a layout that is stored in a tangible form, such as in a digital format on a computer readable medium. For example, the layout including the sub-resolution shapes placed according to the methods as disclosed herein can be stored in a layout data file of one or more cells, selectable from one or more libraries of cells. The layout data file can be formatted as a GDS II (Graphic Data System) database file, an OASIS (Open Artwork System Interchange Standard) database file, or any other type of data file format suitable for storing and communicating semiconductor device layouts. Also, multi-level layouts utilizing the sub-resolution shapes placed according to the methods as disclosed herein can be included within a multi-level layout of a larger semiconductor device. The multi-level layout of the larger semiconductor device can also be stored in the form of a layout data file, such as those identified above.

Also, the invention described herein can be embodied as computer readable code on a computer readable medium. For example, the computer readable code can include the layout data file within which one or more layouts including the sub-resolution shapes placed according to the methods as disclosed herein are stored. The computer readable code can also include program instructions for selecting one or more layout libraries and/or cells that include a layout having sub-resolution shapes defined therein, wherein the sub-resolution shapes are placed according to the methods as disclosed herein. The layout libraries and/or cells can also be stored in a digital format on a computer readable medium.

The computer readable medium mentioned herein is any data storage device that can store data which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network of coupled computer systems so that the computer readable code is stored and executed in a distributed fashion.

Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data may be processed by other computers on the network, e.g., a cloud of computing resources.

The embodiments of the present invention can also be defined as a machine that transforms data from one state to another state. The data may represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

It should be further understood that the layouts as disclosed herein can be manufactured as part of a semiconductor device or chip. In the fabrication of semiconductor devices such as integrated circuits, memory cells, and the like, a series of manufacturing operations are performed to define features on a semiconductor wafer. The wafer includes integrated circuit devices in the form of multi-level structures defined on a silicon substrate. At a substrate level, transistor devices with diffusion regions are formed. In subsequent levels, interconnect metallization lines are patterned and electrically connected to the transistor devices to define a desired integrated circuit device. Also, patterned conductive layers are insulated from other conductive layers by dielectric materials.

While this invention has been described in terms of several embodiments, it will be appreciated that those skilled in the art upon reading the preceding specifications and studying the drawings will realize various alterations, additions, permutations and equivalents thereof. Therefore, it is intended that the present invention includes all such alterations, additions, permutations, and equivalents as fall within the true spirit and scope of the invention.

What is claimed is:

1. A method for using sub-resolution shapes placed on a virtual grate to reinforce regular layout shapes in a lithographic process, comprising:
    operating a computer to determine whether an unoccupied layout space within a level of a cell adjacent to a regular layout shape to be reinforced and extending in a direction perpendicular to the regular layout shape to be reinforced is large enough to support placement of a sub-resolution shape within the level of the cell, wherein the regular layout shape to be reinforced is placed in accordance with a virtual grate;
    upon determining that the unoccupied layout space is large enough to support placement of the sub-resolution shape, operating the computer to place the sub-resolution shape so as to be substantially centered upon a virtual line of the virtual grate within the unoccupied layout space within the level of the cell;
    upon determining that the unoccupied layout space is not large enough to support placement of the sub-resolution shape, operating the computer to evaluate whether one or more previously placed layout shapes within the level of the cell neighboring the unoccupied layout space are reconfigurable to enlarge the unoccupied layout space within the level of the cell so as to support placement of the sub-resolution shape within the unoccupied layout space within the level of the cell;
    operating the computer to reconfigure the one or more previously placed layout shapes within the level of the cell to enlarge the unoccupied layout space so as to support placement of the sub-resolution shape within the unoccupied layout space within the level of the cell; and
    operating the computer to place the sub-resolution shape so as to be substantially centered upon a virtual line of the virtual grate within the unoccupied layout space within the level of the cell.

2. A method for using sub-resolution shapes placed on a virtual grate to reinforce regular layout shapes in a lithographic process as recited in claim 1, wherein the determining is based on a minimum required perpendicular distance between a first edge of the sub-resolution shape in a proposed placement location and a nearest edge of the regular layout shape to be reinforced.

3. A method for using sub-resolution shapes placed on a virtual grate to reinforce regular layout shapes in a lithographic process as recited in claim 2, wherein the minimum required perpendicular distance is derived from manufacturing rules, lithographic constraints, or a combination thereof.

4. A method for using sub-resolution shapes placed on a virtual grate to reinforce regular layout shapes in a lithographic process as recited in claim 2, wherein the determining is further based on the minimum required perpendicular distance between a second edge of the sub-resolution shape in the proposed placement location and a nearest edge of any other previously placed regular layout shape neighboring the unoccupied layout space.

5. A method for using sub-resolution shapes placed on a virtual grate to reinforce regular layout shapes in a lithographic process as recited in claim 1, wherein the reconfiguring of the one or more previously placed layout shapes includes changing a placement location of the regular layout shape to be reinforced.

6. A method for using sub-resolution shapes placed on a virtual grate to reinforce regular layout shapes in a lithographic process as recited in claim 1, wherein the reconfiguring of the one or more previously placed layout shapes includes changing placement locations of one or more regular layout shapes, one or more sub-resolution shapes, or a combination thereof.

7. A method for using sub-resolution shapes placed on a virtual grate to reinforce regular layout shapes in a lithographic process as recited in claim 1, wherein the reconfiguring of the one or more previously placed layout shapes includes modifying a width dimension of a given regular layout shape so as to change an edge location of the given regular layout shape.

8. A method for using sub-resolution shapes placed on a virtual grate to reinforce regular layout shapes in a lithographic process as recited in claim 1, wherein the virtual grate is defined as a set of virtual lines extending in a parallel manner across a portion of a chip level, wherein adjacent ones of the virtual lines are spaced at a substantially constant pitch.

9. A method for using sub-resolution shapes placed on a virtual grate to reinforce regular layout shapes in a lithographic process as recited in claim 1, wherein each sub-resolution shape is defined as a mask feature in a given chip level that is sized sufficiently small in at least one dimension so as to not lithographically resolve during manufacturing of the given chip level, and wherein each regular layout shape is defined as a mask feature in the given chip level that will lithographically resolve during manufacturing of the given chip level.

10. A method for using sub-resolution shapes placed on a virtual grate to reinforce regular layout shapes in a lithographic process as recited in claim 1, further comprising:
segmenting the sub-resolution shape to ensure non-resolution of the sub-resolution shape, such that the sub-resolution shape having been segmented continues to lithographically reinforce the regular layout shape.

11. A computer readable storage medium having programming instructions stored thereon for generating a semiconductor chip layout recorded in a digital format, comprising:
program instructions for determining whether an unoccupied layout space within a level of a cell adjacent to a regular layout shape to be reinforced and extending in a direction perpendicular to the regular layout shape to be reinforced is large enough to support placement of a sub-resolution shape within the level of the cell, wherein the regular layout shape to be reinforced is placed in accordance with a virtual grate;
program instructions for upon determining that the unoccupied layout space is large enough to support placement of the sub-resolution shape, placing the sub-resolution shape so as to be substantially centered upon a virtual line of the virtual grate within the unoccupied layout space within the level of the cell;
program instructions for upon determining that the unoccupied layout space is not large enough to support placement of the sub-resolution shape, evaluating whether one or more previously placed layout shapes within the level of the cell neighboring the unoccupied layout space are reconfigurable to enlarge the unoccupied layout space within the level of the cell so as to support placement of the sub-resolution shape within the unoccupied layout space within the level of the cell;
program instructions for reconfiguring the one or more previously placed layout shapes within the level of the cell to enlarge the unoccupied layout space so as to support placement of the sub-resolution shape within the unoccupied layout space within the level of the cell; and
program instructions for placing the sub-resolution shape so as to be substantially centered upon a virtual line of the virtual grate within the unoccupied layout space within the level of the cell.

12. A computer readable storage medium having programming instructions stored thereon for generating a semiconductor chip layout recorded in a digital format as recited in claim 11, wherein the virtual grate is defined as a set of virtual lines extending in a parallel manner across a portion of a chip level, wherein adjacent ones of the virtual lines are spaced at a substantially constant pitch.

13. A computer readable storage medium having programming instructions stored thereon for generating a semiconductor chip layout recorded in a digital format as recited in claim 11, wherein the digital format is a data file format for storing and communicating one or more semiconductor device layouts.

14. A computer readable storage medium having programming instructions stored thereon for generating a semiconductor chip layout recorded in a digital format as recited in claim 11, further comprising:
program instructions for accessing and retrieving the semiconductor chip layout or a portion thereof in the digital format from the computer readable storage medium.

15. A method for placing sub-resolution shapes within a layout based on regular layout shape edges, comprising:
selecting a first edge of a first regular layout shape to be reinforced within a level of a cell;
operating a computer to determine that a second regular layout shape is placed parallel to and facing the first edge of the first regular layout shape within the level of the cell;
selecting a second edge of the second regular layout shape to be reinforced, wherein the second edge faces the first edge;
operating the computer to determine a first window of lithographic reinforcement for the first edge;
operating the computer to determine a second window of lithographic reinforcement for the second edge;
operating the computer to determine that the first and second windows of lithographic reinforcement support placement of at least one sub-resolution shape within an unoccupied layout space within the level of the cell between the first and second edges;
operating the computer to place one or more sub-resolution shapes within the unoccupied layout space within the level of the cell such that each of the one or more sub-resolution shapes is placed within at least one of the first and second windows of lithographic reinforcement and such that the one or more sub-resolution shapes are placed so as to extend parallel to the first and second edges;
operating the computer to determine that the first and second windows of lithographic reinforcement do not support placement of at least one sub-resolution shape within the unoccupied layout space within the level of the cell between the first and second edges;
operating the computer to evaluate whether either or both of the first and second regular layout shapes are reconfigurable to enlarge the unoccupied layout space within the level of the cell between the first and second edges so as to support placement of at least one sub-resolution shape within the unoccupied layout space within the level of the cell;
operating the computer to reconfigure either or both of the first and second regular layout shapes to enlarge the unoccupied layout space within the level of the cell so as to support placement of at least one sub-resolution shape within the unoccupied layout space within the level of the cell; and
operating the computer to place at least one sub-resolution shape within the unoccupied layout space within the level of the cell and within at least one of the first and second windows of lithographic reinforcement so as to extend parallel to the first and second edges.

16. A method for placing sub-resolution shapes within a layout based on regular layout shape edges as recited in claim 15, wherein determining the first window of lithographic reinforcement for the first edge includes determining minimum and maximum perpendicular distances permitted between the first edge and a sub-resolution shape such that undesired lithographic effects are prevented, and
wherein determining the second window of lithographic reinforcement for the second edge includes determining minimum and maximum perpendicular distances permitted between the second edge and a sub-resolution shape such that undesired lithographic effects are prevented.

17. A method for placing sub-resolution shapes within a layout based on regular layout shape edges as recited in claim 16, wherein undesired lithographic effects include unintentional resolution of a sub-resolution shape, unintentional distortion of any regular layout shape, lack of reinforcement of the first and second regular layout shapes, or combination thereof.

18. A method for placing sub-resolution shapes within a layout based on regular layout shape edges as recited in claim 15, wherein a determination is made that the first and second windows of lithographic reinforcement support placement of at least one sub-resolution shape within the unoccupied layout space between the first and second edges when the first and second windows of lithographic reinforcement overlap, or when a space exists between the first and second windows of lithographic reinforcement that are wholly contained within the unoccupied layout space between the first and second edges.

19. A method for placing sub-resolution shapes within a layout based on regular layout shape edges as recited in claim 15, wherein reconfiguring a given regular layout shape includes changing a placement location of the given regular layout shape.

20. A method for placing sub-resolution shapes within a layout based on regular layout shape edges as recited in claim 15, wherein reconfiguring a given regular layout shape includes modifying a width dimension of the given regular layout shape so as to change an edge location of the given regular layout shape.

21. A method for placing sub-resolution shapes within a layout based on regular layout shape edges as recited in claim 15, further comprising:
segmenting a number of the one or more sub-resolution shapes to ensure non-resolution of the one or more sub-resolution shapes, such that each sub-resolution shape having been segmented continues to lithographically reinforce either or both of the first and second regular layout shapes.

22. A computer readable storage medium having programming instructions stored thereon for generating a semiconductor chip layout recorded in a digital format, comprising:
program instructions for selecting a first edge of a first regular layout shape to be reinforced within a level of a cell;
program instructions for determining that a second regular layout shape is placed parallel to and facing the first edge of the first regular layout shape within the level of the cell;
program instructions for selecting a second edge of the second regular layout shape to be reinforced, wherein the second edge faces the first edge;
program instructions for determining a first window of lithographic reinforcement for the first edge;
program instructions for determining a second window of lithographic reinforcement for the second edge;
program instructions for determining that the first and second windows of lithographic reinforcement support placement of at least one sub-resolution shape within an unoccupied layout space within the level of the cell between the first and second edges; and
program instructions for placing one or more sub-resolution shapes within the unoccupied layout space within the level of the cell such that each of the one or more sub-resolution shapes is placed within at least one of the first and second windows of lithographic reinforcement and such that the one or more sub-resolution shapes are placed so as to extend parallel to the first and second edges;
program instructions for determining that the first and second windows of lithographic reinforcement do not support placement of at least one sub-resolution shape within the unoccupied layout space within the level of the cell between the first and second edges;
program instructions for evaluating whether either or both of the first and second regular layout shapes are reconfigurable to enlarge the unoccupied layout space within the level of the cell between the first and second edges so as to support placement of at least one sub-resolution shape within the unoccupied layout space within the level of the cell;
program instructions for reconfiguring either or both of the first and second regular layout shapes to enlarge the unoccupied layout space within the level of the cell so as to support placement of at least one sub-resolution shape within the unoccupied layout space within the level of the cell; and
program instructions for placing at least one sub-resolution shape within the unoccupied layout space within the level of the cell and within at least one of the first and second windows of lithographic reinforcement so as to extend parallel to the first and second edges.

23. A computer readable storage medium having programming instructions stored thereon for generating a semiconductor chip layout recorded in a digital format as recited in claim 22, wherein the program instructions for determining the first window of lithographic reinforcement for the first edge includes program instructions for determining minimum and maximum perpendicular distances permitted between the first edge and a sub-resolution shape such that undesired lithographic effects are prevented, and
wherein the program instructions for determining the second window of lithographic reinforcement for the second edge includes program instructions for determining minimum and maximum perpendicular distances permitted between the second edge and a sub-resolution shape such that undesired lithographic effects are prevented.

24. A computer readable storage medium having programming instructions stored thereon for generating a semiconductor chip layout recorded in a digital format as recited in claim 22, wherein the digital format is a data file format for storing and communicating one or more semiconductor device layouts.

25. A computer readable storage medium having programming instructions stored thereon for generating a semiconductor chip layout recorded in a digital format as recited in claim 22, further comprising:
program instructions for accessing and retrieving the semiconductor chip layout or a portion thereof in the digital format from the computer readable storage medium.

* * * * *